US012746530B2

(12) United States Patent
Min et al.

(10) Patent No.: US 12,746,530 B2
(45) Date of Patent: Sep. 29, 2026

(54) SUPER ABSORBENT POLYMER

(71) Applicant: LG Chem, Ltd., Seoul (KR)

(72) Inventors: Kyungchan Min, Daejeon (KR); Tae Yun Kim, Daejeon (KR); Byoung Hyoun Kim, Daejeon (KR); Sung Soo Park, Daejeon (KR); Byung Hyun Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/968,600

(22) Filed: Dec. 4, 2024

(65) Prior Publication Data

US 2025/0352982 A1 Nov. 20, 2025

(30) Foreign Application Priority Data

May 14, 2024 (KR) ........................ 10-2024-0063013

(51) Int. Cl.
*C08F 220/06* (2006.01)
*B01J 20/26* (2006.01)
*B01J 20/28* (2006.01)

(52) U.S. Cl.
CPC ....... *B01J 20/261* (2013.01); *B01J 20/28004* (2013.01); *B01J 20/28011* (2013.01); *C08F 220/06* (2013.01)

(58) Field of Classification Search
CPC .............................. B01J 20/261; C08F 220/06
See application file for complete search history.

(56) References Cited

U.S. PATENT DOCUMENTS

| | | | |
|---|---|---|---|
| 5,338,766 | A | 8/1994 | Phan et al. |
| 6,319,558 | B1 | 11/2001 | Willemsen |
| 10,994,260 | B2 | 5/2021 | Kovacic et al. |
| 2005/0003191 | A1 | 1/2005 | Ehrnsperger et al. |
| 2005/0239942 | A1 | 10/2005 | Herfert et al. |
| 2006/0020053 | A1 | 1/2006 | Flohr et al. |
| 2007/0264489 | A1 | 11/2007 | Sasabe et al. |
| 2008/0021150 | A1 | 1/2008 | Becker et al. |
| 2008/0075937 | A1 | 3/2008 | Wada et al. |
| 2008/0140037 | A1 | 6/2008 | Newman |
| 2010/0216938 | A1 | 8/2010 | Becker et al. |
| 2012/0220452 | A1 | 8/2012 | Matsumoto et al. |
| 2013/0026412 | A1 | 1/2013 | Machida et al. |
| 2013/0102750 | A1 | 4/2013 | Watanabe et al. |
| 2013/0136713 | A1 | 5/2013 | Terada et al. |
| 2013/0175473 | A1 | 7/2013 | Wada et al. |
| 2014/0031203 | A1 | 1/2014 | Kondo et al. |
| 2014/0031473 | A1 | 1/2014 | Nogi et al. |
| 2015/0299404 | A1 | 10/2015 | Daniel et al. |
| 2015/0307681 | A1 | 10/2015 | Park et al. |
| 2015/0322180 | A1 | 11/2015 | Matsumoto et al. |
| 2016/0208035 | A1 | 7/2016 | Ryu et al. |
| 2017/0014801 | A1 | 1/2017 | Ikeuchi et al. |
| 2017/0073478 | A1 | 3/2017 | Joo et al. |
| 2017/0189575 | A1 | 7/2017 | Lee et al. |
| 2017/0216817 | A1 | 8/2017 | Torii et al. |
| 2017/0233534 | A1 | 8/2017 | Kim et al. |
| 2017/0312148 | A1 | 11/2017 | Dobrosielska-Oura et al. |
| 2018/0021437 | A1 | 1/2018 | Kim et al. |
| 2018/0037686 | A1 | 2/2018 | Lee et al. |
| 2018/0243464 | A1 | 8/2018 | Hwang et al. |
| 2019/0099739 | A1 | 4/2019 | Lee et al. |
| 2019/0308171 | A1 | 10/2019 | Kim et al. |
| 2019/0344243 | A1 | 11/2019 | Lee et al. |
| 2020/0085716 | A1 | 3/2020 | Mehling et al. |
| 2020/0139344 | A1 | 5/2020 | Kim et al. |
| 2020/0247958 | A1 | 8/2020 | Park et al. |
| 2021/0008521 | A1 | 1/2021 | Choi et al. |
| 2021/0033516 | A1 | 2/2021 | Toennessen et al. |
| 2021/0040271 | A1 | 2/2021 | Lee et al. |
| 2021/0100684 | A1 | 4/2021 | Kitabata et al. |
| 2021/0113989 | A1 | 4/2021 | Hur et al. |
| 2021/0121852 | A1 | 4/2021 | Herfert et al. |
| 2021/0154637 | A1 | 5/2021 | Pfeiffer et al. |
| 2021/0244844 | A1 | 8/2021 | Chan et al. |

(Continued)

FOREIGN PATENT DOCUMENTS

| | | | |
|---|---|---|---|
| CA | 2319786 | A1 | 8/1999 |
| CN | 001136355 | C | 1/2004 |

(Continued)

OTHER PUBLICATIONS

Shi, M. et al., "The Development of a Polysaccharide-Based Hydrogel Encapsulating Tobramycin-Loaded Gelatine Microspheres as an Antibacterial System" gels, MDPI, Mar. 2023, pp. 1-15, vol. 9, No. 3.
Zhang, S. et al., "Predicting the Swelling Behavior of Acrylic Superabsorbent Polymers Used in Diapers" Willey Hindawi, Advances in Polymer Technology, Dec. 2021, pp. 1-7, vol. 2021.
International Search Report for Application No. PCT/KR2024/018688 mailed Mar. 7, 2025. 5 pages (see p. 2-4, categorizing the cited references).
International Search Report for Application No. PCT/KR2024/018689 mailed Mar. 7, 2025. 5 pages (see p. 2-4, categorizing the cited references).
George Odian, "Principles of Polymerization" , Wiley-Interscience, Feb. 2004. 839 pages.

(Continued)

*Primary Examiner* — Karuna P Reddy
(74) *Attorney, Agent, or Firm* — Lerner David LLP

(57) ABSTRACT

A polyacrylic acid (salt)-based super absorbent polymer has a swelling factor (SF) value of 85 to 110 derived by Equation 1. Equation 1 is SF=1+[(7,700/w)×($A_S$-$A_R$)/$A_S$], wherein w is a weight (mg) of the super absorbent polymer, $A_S$ is an absorbance at 620 nm of a solution obtained by centrifuging an aqueous solution including the polyacrylic acid (salt)-based super absorbent polymer and Blue dextran under a condition of 200 G to 280 G, and $A_R$ is an absorbance at 620 nm of an aqueous solution including the Blue dextran, which is a reference sample.

13 Claims, 4 Drawing Sheets

(56) References Cited

U.S. PATENT DOCUMENTS

| | | | |
|---|---|---|---|
| 2021/0309777 | A1 | 10/2021 | Lee et al. |
| 2021/0362126 | A1 | 11/2021 | Bauer et al. |
| 2022/0088568 | A1 | 3/2022 | Kimura et al. |
| 2022/0184579 | A1 | 6/2022 | Yan et al. |
| 2023/0102961 | A1 | 3/2023 | Nishimura et al. |
| 2023/0330629 | A1 | 10/2023 | Won et al. |
| 2023/0338925 | A1 | 10/2023 | Chung et al. |
| 2023/0347317 | A1 | 11/2023 | Yoon et al. |
| 2023/0374232 | A1 | 11/2023 | Ryu et al. |
| 2023/0381744 | A1 | 11/2023 | Woo et al. |
| 2024/0238759 | A1 | 7/2024 | Ryu et al. |
| 2024/0253012 | A1 | 8/2024 | Tsuru et al. |
| 2024/0261762 | A1 | 8/2024 | Kim et al. |
| 2024/0278210 | A1 | 8/2024 | Lee et al. |
| 2024/0278211 | A1 | 8/2024 | Han et al. |
| 2024/0351003 | A1 | 10/2024 | Nam et al. |

FOREIGN PATENT DOCUMENTS

| | | | | |
|---|---|---|---|---|
| EP | 1024176 | A1 | 8/2000 | |
| EP | 3270857 | B1 | 12/2019 | |
| EP | 4137534 | A1 | 2/2023 | |
| EP | 4206244 | A1 | 7/2023 | |
| EP | 4253451 | A1 * | 10/2023 | ............... B29B 9/02 |
| EP | 4321559 | A1 | 2/2024 | |
| EP | 4321561 | A1 | 2/2024 | |
| JP | H08122284 | A | 5/1996 | |
| JP | 2001-106728 | A | 4/2001 | |
| JP | 2002-504568 | A | 2/2002 | |
| JP | 2005097569 | A | 4/2005 | |
| JP | 3745539 | B2 | 2/2006 | |
| JP | 2006527641 | A | 12/2006 | |
| JP | 2007-512405 | A | 5/2007 | |
| JP | 2009057496 | A | 3/2009 | |
| JP | 4261853 | B2 | 4/2009 | |
| JP | 4284767 | B2 | 6/2009 | |
| JP | 4908545 | B2 | 4/2012 | |
| JP | 2012-097273 | A | 5/2012 | |
| JP | WO 2012-144564 | A1 | 7/2014 | |
| JP | 5616437 | B2 | 10/2014 | |
| JP | 5692844 | B2 | 4/2015 | |
| JP | 2015120933 | A | 7/2015 | |
| JP | 5913423 | B2 | 4/2016 | |
| JP | 2017-531531 | A | 10/2017 | |
| JP | 2017185485 | A | 10/2017 | |
| JP | 2018-510041 | A | 4/2018 | |
| JP | 2021-510320 | A | 4/2021 | |
| JP | 6890190 | B2 | 6/2021 | |
| JP | 6950158 | B2 | 10/2021 | |
| JP | 6959030 | B2 | 11/2021 | |
| JP | 7181948 | B2 | 12/2022 | |
| JP | 7270828 | B2 | 5/2023 | |
| JP | 7362653 | B2 | 10/2023 | |
| KR | 100317398 | B1 | 11/2002 | |
| KR | 20050036974 | A | 4/2005 | |
| KR | 20070039050 | A | 4/2007 | |
| KR | 20070048226 | A | 5/2007 | |
| KR | 20070083761 | A | 8/2007 | |
| KR | 20130097771 | A | 9/2013 | |
| KR | 20140063116 | A | 5/2014 | |
| KR | 20150062959 | A | 6/2015 | |
| KR | 20150087368 | A | 7/2015 | |
| KR | 20150142636 | A | 12/2015 | |
| KR | 20150143181 | A | 12/2015 | |
| KR | 20160127742 | A | 11/2016 | |
| KR | 101700354 | B1 | 1/2017 | |
| KR | 20170020113 | A | 2/2017 | |
| KR | 20170033634 | A | 3/2017 | |
| KR | 20170063818 | A | 6/2017 | |
| KR | 20170111295 | A | 10/2017 | |
| KR | 101812895 | B1 | 12/2017 | |
| KR | 101848470 | B1 | 4/2018 | |
| KR | 20180073334 | A | 7/2018 | |
| KR | 20180074384 | A | 7/2018 | |
| KR | 101908142 | B1 | 10/2018 | |
| KR | 101918647 | B1 | 11/2018 | |
| KR | 20190012809 | A | 2/2019 | |
| KR | 20190016534 | A | 2/2019 | |
| KR | 101989142 | B1 | 6/2019 | |
| KR | 20190072406 | A | 6/2019 | |
| KR | 102094453 | B1 | 3/2020 | |
| KR | 20200051565 | A | 5/2020 | |
| KR | 20200062012 | A | 6/2020 | |
| KR | 20200073044 | A | 6/2020 | |
| KR | 20200123127 | A | 10/2020 | |
| KR | 102322774 | B1 | 11/2021 | |
| KR | 20220046497 | A | 4/2022 | |
| KR | 20220049961 | A | 4/2022 | |
| KR | 20220068184 | A | 5/2022 | |
| KR | 20220088351 | A | 6/2022 | |
| KR | 20220169431 | A | 12/2022 | |
| KR | 20220169437 | A | 12/2022 | |
| KR | 20220169444 | A | 12/2022 | |
| KR | 102568226 | B1 | 8/2023 | |
| KR | 20230120110 | A | 8/2023 | |
| KR | 102578740 | B1 | 9/2023 | |
| KR | 102584470 | B1 | 10/2023 | |
| KR | 20240014710 | A | 2/2024 | |
| WO | 2022108430 | A1 | 5/2022 | |
| WO | 2022131838 | A1 | 6/2022 | |
| WO | 2022265466 | A1 | 12/2022 | |
| WO | 2022265472 | A1 | 12/2022 | |
| WO | 2022265473 | A1 | 12/2022 | |
| WO | 2022265477 | A1 | 12/2022 | |
| WO | WO-2022265459 | A1 * | 12/2022 | ............... B29B 9/02 |

OTHER PUBLICATIONS

International Search Report for Application No. PCT/KR2025/002375 mailed Jun. 2, 2025. 3 pages.

International Search Report for Application No. PCT/KR2025/002377 mailed May 26, 2025. 3 pages.

International Search Report for Application No. PCT/KR2025/095022 mailed Jul. 4, 2025. 3 pages.

Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.

Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902.11 pgs.

Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.

International Search Report for Application No. PCT/KR2025/006025 mailed Aug. 6, 2025, 13 pages.

International Search Report for Application No. PCT/KR2025/006542 mailed Aug. 27, 2025, 9 pages.

International Search Report for Application No. PCT/KR2025/006675 mailed Aug. 27, 2025, 9 pages.

International Search Report for Application No. PCT/KR2025/006678 mailed Aug. 29, 2025, 11 pages.

Kwon, Y.R."Surface-crosslinking of itaconic acid-based superabsorbent polymer using a novel bio-based surface-crosslinker based on succinic acid" Polymer-Plastics Technology and Materials, Taylor & Francis, Mar. 2023, pp. 1057-1066, vol. 62, Issue 8.

Sharma, S. et al., "Superabsorbent Polymer Gels based on Polyaspartic Acid and Polyacrylic Acid" Journal of Material Science & Engineering, Feb. 2016, pp. 1-7, vol. 5, Issue 3.

Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.

* cited by examiner

SUPER ABSORBENT POLYMER

CROSS-REFERENCE TO RELATED APPLICATION

This application claims priority to Korean Patent Application No. 10-2024-0063013 filed on May 14, 2024, the content of which is incorporated by reference in its entirety.

BACKGROUND

The present disclosure herein relates to a super absorbent polymer having a suitable gel strength and excellent absorption performance at the same time.

A super absorbent polymer (SAP) is a synthetic polymer material which has the ability to absorb moisture 500 times to 1,000 times its own weight, and is given different names, such as a super absorbency material (SAM) and an absorbent gel material (AGM), by each developer. The above-described super absorbent polymer was first put into practical use in diapers, hygiene products, and the like, and is now widely used as a material for soil repair agents for horticulture, a civil engineering work, a construction index material, a seedling sheet, a freshness maintaining agent in a food distribution field, and a fomentation.

Particularly, the super absorbent polymer is widely used in the field of hygiene products such as diapers or sanitary napkins, and thus, may exhibit not only high absorption performance but also a fast absorption rate.

In addition, in order to provide thinner products, the development of products with a reduced content of pulp, or furthermore, with no pulp, such as so-called pulpless products, is actively in progress. As a result, a super absorbent polymer is included at a relatively high ratio in a product, and super absorbent polymer particles are inevitably included in multiple layers in the product. Accordingly, the importance of the absorption rate of a super absorbent polymer is further increasing.

To this end, a method is generally used, wherein cross-linking polymerization is performed by including a foaming agent in a monomer composition, thereby forming a porous structure in base resin powder to increase the surface area of a super absorbent polymer.

However, when various post-treatment processes such as surface cross-linking and foaming are performed, or various additives are used, the cross-linking density of a polymer is degraded, making it impossible to implement sufficient gel strength, and also, an additive and the like are deintercalated, thereby causing a problem in which user's wearing comfort is degraded due to rashes on the skin when the polymer is applied to a product.

On the contrary, if the cross-linking density of a super absorbent polymer is controlled to be high in order to improve overall physical properties of the super absorbent polymer, it is difficult for moisture to be absorbed through a dense cross-linked structure, so that there is a problem in that the centrifuge retention capacity and the like, which are basic physical properties of the super absorbent polymer, is degraded.

Accordingly, there has been a continuous demand for the development of a new super absorbent polymer which maintains a suitable gel strength, and at the same time, has improved absorption physical properties such as centrifuge retention capacity and absorption rate.

SUMMARY

The present disclosure provides a super absorbent polymer having excellent absorption physical properties while having a suitable gel strength by adjusting a numerical value of a swelling factor to a predetermined level, the value derived by using the absorbance of a solution obtained by centrifuging an aqueous solution including a super absorbent polymer (SAP) and Blue dextran In accordance with an aspectof the present disclosure, there is provided a polyacrylic acid (salt)-based super absorbent polymer having a swelling factor (SF) value of 85 to 110 derived by Equation 1 below.

$$SF = 1 + \left[(7{,}700/w) \times (A_S - A_R)/A_S\right] \qquad \text{[Equation 1]}$$

In [Equation 1] above, w is a weight (mg) of the super absorbent polymer, $A_S$ is an absorbance at 620 nm of a solution obtained by centrifuging an aqueous solution including the super absorbent polymer and Blue dextran under the condition of 200 G to 280 G, and $A_R$ is an absorbance at 620 nm of an aqueous solution including Blue dextran, which is a reference sample.

BRIEF DESCRIPTION OF THE DRAWINGS

Example aspects can be understood in more detail from the following description taken in conjunction with the accompanying drawing, in which.

DETAILED DESCRIPTION

Figure 1:
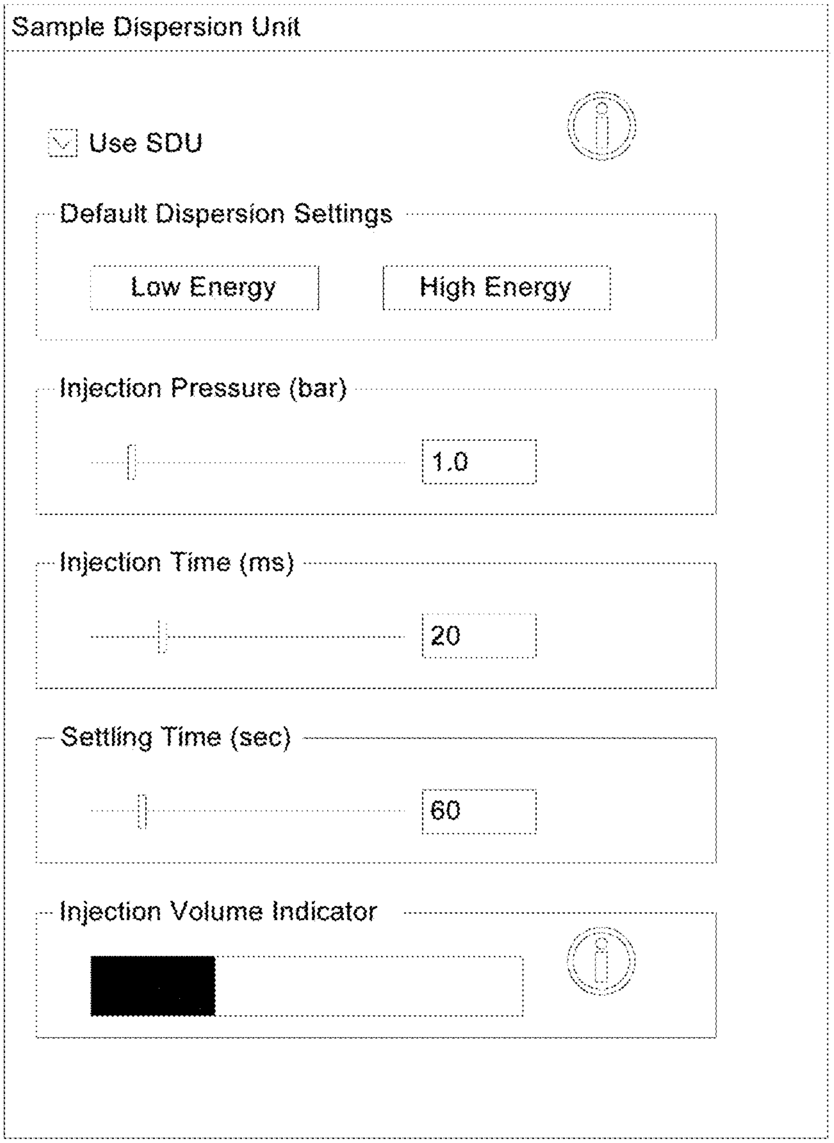
FIG. 1 shows setting values of a Sample Suspension Dispersion Unit in morphologi 4 of Malvern Panalytical Co., Ltd.

Unless otherwise defined herein, all technical and scientific terms are used to describe illustrative aspects only and are not intended to limit the present disclosure. Singular expressions include plural expressions unless the context clearly indicates otherwise. In the present specification, it should be understood that the term "include," "comprise," or "have" is intended to specify the presence of stated features, numbers, steps, elements, or combinations thereof, but do not preclude the presence or addition of one or more other features, numbers, steps, elements, or combinations thereof.

The present disclosure may be modified in various ways and may take many forms, and specific aspects are illustrated and described in detail below. It should be understood, however, that it is not intended to limit the present disclosure to the particular forms disclosed, but rather, is intended to cover all modifications, equivalents, and alternatives falling within the spirit and scope of the above ideas and techniques.

The terminology used herein is for reference only to particular implementations, and is not intended to limit the present disclosure. In addition, the singular forms used herein include plural forms, unless the phrases clearly indicate the opposite meaning.

The term "polymer" or "polymer" as used in the present disclosure means that a water-soluble ethylene-based polyunsaturated monomer is in a polymerized state, and may cover any moisture content range or particle size range.

In addition, the term "super absorbent polymer" either means, depending on the context, a cross-linked polymer, or a base polymer in the form of powder in which the cross-linked polymer is made of pulverized super absorbent polymer particles, or is used to cover the cross-linked polymer or the base polymer subjected to additional processes, such as drying, pulverization, classification, surface cross-linking, etc., thereby being in a state suitable for commercialization.

In addition, the term "fine powder" means particles having a particle size of less than 150 μm among super absorbent polymer particles. The particle size of the above-described polymer particles may be measured according to the method of EDANA WSP 220.3 of the European Disposables and Nonwovens Association (EDANA) standards.

In addition, the term "chopping" refers to cutting a hydrogel polymer into small pieces in a millimeter unit to increase drying efficiency, and is used separately from pulverizing the same to a micrometer or normal particle level.

In addition, the term "micronizing, or micronization" refers to pulverizing a hydrogel polymer into pieces having a particle diameter of tens to hundreds of micrometers, and is used separately from "chopping."

In addition, the term "free swelling" refers to a state in which a super absorbent polymer may swell without a suppressing load when absorbing a specific solution.

In the present specification, elemental symbols as those described in the periodic table are used.

Hereinafter, a super absorbent polymer according to a specific aspect of the present disclosure and a preparation method therefor will be described in more detail.

I. Polyacrylic Acid (Salt)-Based Super Absorbent Polymer

The super absorbent polymer of the present disclosure is a polyacrylic acid (salt)-based super absorbent polymer, and is characterized in that the value of a swelling factor derived by using the absorbance of a solution obtained by centrifuging an aqueous solution including the super absorbent polymer (SAP) and Blue dextran satisfies 85 to 110.

Absorption, which is one of the optical properties (absorption, fluorescence, luminescence, etc.) of a material refers to a property of a material to absorb light of a specific wavelength, and absorbance (A), which indicates the amount of light absorbed by the material, varies depending on the concentration of a material, and it is possible to quantitatively analyze a material which absorbs a specific wavelength by using absorbance.

Blue dextran is a blue dye in which dextran having an average molecular weight of about 2 million is combined with and Cibacron Blue F3GA, and has a property of absorbing light at a specific wavelength of about 620 nm.

The super absorbent polymer absorbs water but is not able to absorb Blue dextran having a high molecular weight. Therefore, when water and Blue dextran are introduced together in the super absorbent polymer, the super absorbent polymer absorbs only the water and does not absorb the Blue dextran, so that the concentration of Blue dextran in a solution of the remaining water and the Blue dextran may vary depending on how much the super absorbent polymer absorbs the water.

That is, in the case of a super absorbent polymer which absorbs a large amount of water, the concentration of Blue dextran is large in a solution remaining after removing the super absorbent polymer which has absorbed water, whereas in the case of a super absorbent polymer which absorbs a small amount of water, the concentration of Blue dextran is relatively small in a solution remaining after removing the super absorbent polymer which has absorbed water.

Blue dextran absorbs light at a specific wavelength of 620 nm, so that if the concentration of the Blue dextran is large, the absorbance at 620 nm increases, and if the concentration of the Blue dextran is mall, the absorbance at 620 nm decreases. If the absorbance at a specific wavelength of a solution including a material absorbing light of a specific wavelength and a super absorbent polymer is used, the absorbency of the super absorbent polymer may be confirmed.

A swelling factor may be derived through Equation 1 below by using the absorbance of a solution obtained by centrifuging an aqueous solution including the SAP and Blue dextran.

$$SF = 1 + \left[(7{,}700/w) \times (A_S - A_R)/A_S\right] \qquad \text{[Equation 1]}$$

In [Equation 1] above, w is a weight (mg) of the super absorbent polymer, $A_S$ is an absorbance at 620 nm of a solution obtained by centrifuging an aqueous solution including the super absorbent polymer and Blue dextran under the condition of 200 G to 280 G, and $A_R$ is an absorbance at 620 nm of an aqueous solution including Blue dextran, which is a reference sample.

The swelling factor may be derived through a difference in absorbance at 620 nm of an aqueous solution including the super absorbent polymer and Blue dextran and a Blue dextran aqueous solution including no super absorbent polymer.

The swelling factor is a factor with which the absorption properties of the SAP may be identified, and refers to a force by which solids of a solid increase the volume thereof by contacting a liquid, thereby absorbing the liquid.

The inventors of the present disclosure have found that if the above-described swelling factor of a super absorbent polymer has a specific numerical range, the gel strength, centrifuge retention capacity, absorbency under pressure, absorption rate, and the like of the super absorbent polymer may be excellent in combination, and have completed the present disclosure.

Specifically, a method for deriving the swelling factor (SF) of a super absorbent polymer is as follows.

Step 1) Preparation of Super Absorbent Polymer Sample 10 mg of a super absorbent polymer sample was placed in a 40 mL conical tube, and added with 30 mL of distilled water, and then the mixture was left to stand at room temperature for 30 minutes.

Thereafter, 1 mL of a 5 mg/mL aqueous solution of Blue dextran (10 kDa) was added to the above-described sample, and the mixture was centrifuged for 20 minutes by setting the rotation speed of a centrifugal separator at 200 G to 280 G.

Step 2) Measurement of Absorbance and Calculation of Swelling Factor (SF)

Thereafter, a supernatant was filtered, and then an absorbance ($A_S$) of the corresponding sample was measured at a wavelength of 620 nm by using a UV-Vis spectrophotometer (Cary 8454 Spectrophotometer, Agilent).

In addition, a sample was prepared as a reference sample in the same manner as the above-described method except that the super absorbent polymer sample was not added, and an absorbance ($A_R$) in a 620 nm region was measured by the above method.

The absorbance of each of Examples and Comparative Examples was measured by the above-described method, and swelling factors were calculated according to Equation 1 below.

$$SF = 1 + \left[(7{,}700/w) \times (A_S - A_R)/A_S\right] \qquad \text{[Equation 1]}$$

In [Equation 1] above, w is a weight (mg) of the super absorbent polymer, $A_S$ is an absorbance at 620 nm of a solution obtained by centrifuging an aqueous solution including the super absorbent polymer and Blue dextran under the condition of 200 G to 280 G, and $A_R$ is an absorbance at 620 nm of an aqueous solution including Blue dextran, which is a reference sample.

In the present disclosure, before measuring the absorbance, centrifugation is performed under the condition of 200 G to 280 G in order to remove the super absorbent polymer from the aqueous solution including the super absorbent polymer and the Blue dextran.

When the aqueous solution including the super absorbent polymer and the Blue dextran is centrifuged, the super absorbent polymer swollen by absorbing water has a high density, and thus, sinks to the bottom, and the aqueous solution in which the Blue dextran having a low density is dissolved moves to an upper layer portion.

Thereafter, when a supernatant of the upper layer portion is filtered, the super absorbent polymer containing water is removed, thereby leaving only the solution in which the Blue dextran is dissolved, and when absorbance is measured on this sample, in the case of a super absorbent polymer having excellent absorption physical properties, the content of water in an aqueous solution is low, that is, the concentration of Blue dextran in the aqueous solution is high, so that a numerical value of the absorbance is measured to be high.

In the present disclosure, the centrifugation is performed under the condition of 200 G to 280 G, and the rotation speed of the centrifugal separator is a rotation speed which may be used to identify whether the super absorbent polymer has a suitable gel strength.

If the centrifugation is performed at a rotation speed of 200 G to 280 G, a super absorbent polymer having an excessively low gel strength may not be able to withstand the rotation speed, thereby causing cross-linking in the polymer to be partially broken or the added Blue dextran and the swollen super absorbent polymer may collide with each other by the rotation, thereby destructing the super absorbent polymer, which results in allowing the water absorbed in the super absorbent polymer to be discharged again to the outside of the polymer, so that an absorbance value may be measured to be low.

That is, in the case of a super absorbent polymer having a low gel strength, even if the absorption performance thereof is excellent, an absorbance value of a Blue dextran aqueous solution from which the super absorbent polymer is removed after centrifugation is low, and a swelling factor value is also low.

If the gel strength of a super absorbent polymer is too high, there is no problem of the destruction of a super absorbent polymer and the like during centrifugation, so that water absorbed in the super absorbent polymer is not discharged again to the outside, but an amount of the absorbed water is small, so that values of absorbance and swelling factor at 620 nm may be low.

Therefore, in order to have high values of absorbance and swelling factor at 620 nm, a super absorbent polymer should have excellent absorption performance while having a gel strength of a suitable level.

The super absorbent polymer according to the present disclosure has excellent absorption performance while having a gel strength equal to or greater than a suitable level, and thus, has high values of absorbance and swelling factor at 620 nm.

In the present disclosure, if the rotation speed at the time of centrifugation is greater than 280 G, cross-linking in a swollen super absorbent polymer is mostly broken due to an excessively high rotation speed, so that it is impossible to determine whether the super absorbent polymer has a suitable gel strength and excellent absorption properties at the same time. On the contrary, if the rotation speed at the time of the centrifugation is less than 200 G, most super absorbent polymers are able to withstand the rotation speed regardless of the gel strength thereof due to an excessively low rotation speed, so that absorbance and swelling factor values measured afterwards may not have a technical significance.

As described above, absorbance of a Blue dextran aqueous solution from which a super absorbent polymer is removed after centrifugation is affected by absorption properties of the super absorbent polymer, but it cannot be said that the absorbance is high just because the absorption properties are high, and for example, even if super absorbent polymers have similar absorption properties, such as centrifuge retention capacity or absorbency under pressure, the absorbance may be degraded if the gel strength in a swollen state is low depending on the degree of cross-linking in the polymer, and conversely, even if super absorbent polymers have similar gel strength, the absorbency may be measured differently if there is a difference in absorption properties, such as centrifuge retention capacity or absorbency under pressure.

Therefore, only the super absorbent polymer having excellent absorption performance, such as centrifuge retention capacity or absorbency under pressure, as well as having a suitable gel strength, has absorbance with a suitable value at 620 nm, and the swelling factor value of Equation 1 above, which reflects the weight of the reference sample and the super absorbent polymer, satisfies a predetermined numerical range.

A swelling factor value derived by using the absorbance measured in a Blue dextran aqueous solution from which a super absorbent polymer is removed after centrifugation at a rotation speed of 200 G to 280 G may be said to be a value comprehensively reflecting gel strength and absorption properties of the super absorbent polymer.

The super absorbent polymer according to the present disclosure may have a swelling factor value of 85 or greater, 87 or greater, or 90 or greater, and 110 or less, 107 or less, or 105 or less derived by Equation 1 above.

In an aspect of the present disclosure, the absorbance ($A_S$) at 620 nm of the solution obtained by centrifuging the aqueous solution including the super absorbent polymer and Blue dextran under the condition of 200 G to 280 G may be 0.18 or greater, 0.185 or greater, or 0.189 or greater.

In addition, in an aspect of the present disclosure, the absorbance ($A_S$) at 620 nm of the solution obtained by centrifuging the aqueous solution including the super absorbent polymer and Blue dextran under the condition of 200 G to 280 G may be 0.20 or less, 0.197 or less, or 0.195 or less.

The super absorbent polymer according to the present disclosure may have a swelling factor value having a predetermined numerical range by comprehensively combining properties such as the surface area with respect to real volume, convexity, CE diameter, and gel strength to be described later.

In an aspect of the present disclosure, the super absorbent polymer may have a surface area with respect to real volume of 43 $mm^{-1}$ or greater, preferably 44 $mm^{-1}$ or greater, and more preferably 45 $mm^{-1}$ or greater. In addition, the surface area with respect to real volume may be 65 $mm^{-1}$ or less, preferably 62 $mm^{-1}$ or less, and more preferably 60 $mm^{-1}$ or less.

In the present specification, the surface area with respect to real volume refers to a value obtained by dividing the total surface area of a super absorbent polymer by the total volume of the super absorbent polymer in a specific reference volume.

The surface area with respect to real volume of the present disclosure is a value obtained by dividing the total surface area of a super absorbent polymer by the total volume of the super absorbent polymer in a specific reference volume, and in the present disclosure, when a super absorbent polymer has a large surface area with respect to real volume, it means that the surface area thereof is large due to a large number of curves on the surface of the super absorbent polymer.

That is, compared to a typical super absorbent polymer, the super absorbent polymer of the present disclosure has a large surface area and many porous structures formed therein, and thus, has a large surface area with respect to real volume, and due to the above-described structure, absorption paths for various fluids are formed, which helps to exhibit a high absorbance value.

The surface area with respect to real volume may be derived by using a three-dimensional (3D) X-ray microscope (XRM).

The XRM rotates a sample and irradiates the rotating sample with X-rays to obtain a tomography image, and may obtain three-dimensional (3D) data based on the tomography image. This is referred to as 3D reconstruction. Conversely, a two-dimensional (2D) cross-sectional image may be extracted from the obtained three-dimensional (3D) data, and after noise is removed from the image, and a measurement target may be separated therefrom, and then converted into three-dimensional (3D) volume data again. When the measurement target is separated from the XRM 2D cross-sectional image and then converted into a 3D volume again, the measurement target may be precisely observed in a three-dimensional form. As described above, if the XRM is used, a super absorbent polymer may be analyzed in a three-dimensional form or two-dimensional form.

Specifically, the surface area with respect to real volume may be derived by the following method.

<Method for Deriving Surface Area with Respect to Real Volume>

Step 1) Drying and Sampling of Super Absorbent Polymer

The super absorbent polymer is dried at about 100° C. for about 12 hours, and the dried super absorbent polymer is sampled in a size of 1.5 cm×1.5 cm×1.5 cm (width×length×height).

Step 2) Derivation of Image

The sampled super absorbent polymer is analyzed using XRM (ZEISS Co., Ltd, Xradia 620 Versa) under the following conditions to derive a 3D image of the super absorbent polymer (3D reconstruction).

<Conditions>

X-Ray Energy: 70 kV detector: Flat Pane

Voxel Size: 5 μm

Measurement time: 0.05 s/frame total images: 4501 images

Step 3) Derivation of Surface Area with Respect to Real Volume ($S_{SAP}/V_C$)

(1) A region of interest (measurement region) is set and truncated from the XRM 2D cross-sectional image of the super absorbent polymer subjected to the 3D reconstruction.

(2) Gaussian blur is applied to the truncated 2D cross-sectional image to remove noise. Subsequently, the 2D cross-sectional image is converted into a binarization image by using the Otsu's thresholding method to distinguish between a background image and a super absorbent polymer particle image. The above process is repeatedly applied to all measurement target 2D images to obtain 2D cross-sectional images showing separated super absorbent polymer particles.

(3) The plurality of 2D cross-sectional images are stacked, and 3D rendering is performed thereon.

(4) From the 3D rendered volume data, a volume ($V_C$) of the total particles of the super absorbent polymer is measured. In addition, in consideration of connectivity of the 3D rendered volume data, a surface area ($S_{SAP}$) of super absorbent polymer particles excluding the surface area of regions of closed pores is measured. At this time, the area of the outer surface (truncated cross-section) of the 3D rendered data is excluded. The surface area ($S_{SAP}$) of the super absorbent polymer particles is divided by the volume ($V_C$) of the total particles of the super absorbent polymer to derive a surface area with respect to real volume of the super absorbent polymer.

In the process of measuring the surface area with respect to real volume, pre-treatment is performed by drying the super absorbent polymer at about 100° C. for about 12 hours in order to measure the surface area with respect to real volume of the super absorbent polymer without the influence of moisture content.

In an aspect of the present disclosure, the super absorbent polymer may have an average value of convexity of 0.92 or less as calculated by Equation 2 below for the total particles.

$$M_c = L_s/L \quad \text{[Equation 2]}$$

In Formula 1 above, $M_c$ is convexity, $L_s$ refers to a length of an elastic band when it is assumed that an image obtained by capturing a 3D image of a 3-dimensional particle to be measured as a 2D image is surrounded by an imaginary elastic band which stretches around the outline of the image, and L refers to an actual circumference length of the image obtained by capturing a 3D image of a 3-dimensional particle to be measured as a 2D image.

The above-described total particles refer to particles of the super absorbent polymer with no limitation on the particle diameter.

The convexity is a parameter for measuring the particle outline and surface roughness of a particle and has a value of 0 to 1, and as the convexity is closer to 1, the outline of a particle is considered to be very smooth, and as the convexity is closer to 0, the outline of a particle is considered to be rough or have many irregularities.

The super absorbent polymer according to the present disclosure has a convexity of 0.92 or less, wherein the particle thereof is somewhat rougher or has more irregularities that that of a typical super absorbent polymer, and thus, may have excellent absorption properties.

At this time, an average value of the convexity is derived from a statistical result obtained by randomly scattering particles on a stage by vacuum in a measuring apparatus, and then securing 200 or more of n numbers to average the numbers.

In an aspect of the present disclosure, the average value of convexity of the total particles of the super absorbent polymer may be 0.80 or greater, 0.83 or greater, 0.85 or greater, or 0.87 or greater, and 0.94 or less, 0.93 or less, or 0.92 or less.

In an aspect of the present disclosure, the super absorbent polymer may have an average value of circle equivalent diameters (CE) of 220 μm to 400 μm.

The CE diameter may refer to a diameter of a circle having the same area as that of an image obtained by capturing a 3D image of a particle as a 2D image, and a size of the particle may be represented through the CE diameter. The average value of CE diameters of the super absorbent polymer may be 220 μm or greater, 230 μm or greater, or 240 μm or greater, and 400 μm or less, 350 μm or less, 330 μm or less, 320 μm or less, or 310 μm or less.

If the average value of the CE diameters of the super absorbent polymer is less than 220 μm, there is a concern in that a large amount of fine powder is generated due to a large of fine particles, and absorption properties are lowered, and if greater than 400 μm, there may be a problem in that the absorption rate is decreased, so that it is preferable that the average value of the CE diameters of the super absorbent polymer is in the above-described ranges.

The average value of the CE diameters is derived from a statistical result obtained by randomly scattering particles on a stage by vacuum in a measuring apparatus, and then securing 200 or more of n numbers to average the numbers.

Super absorbent polymers may have different tendencies in absorption properties, absorption rate, and the like depending on the particle size thereof, and the larger the particle size, the larger the capacity of accommodating water, but the longer it takes to absorb water, and the smaller the particle size, the faster it takes to absorb water, but the smaller the capacity of accommodating water. Therefore, it is necessary to have a suitable particle size distribution, and when a super absorbent polymer has the particle size of the super absorbent polymer according to the present disclosure, the super absorbent polymer may have an excellent physical property balance in both absorption capacity and absorption rate.

In addition, the convexity and CE diameter may be measured using various commercial apparatuses for quantifying and analyzing the morphology of particles based on image analysis of the particles. For example, the parameters may be measured by morphologi 4 of Malvern Panalytical Co., Ltd., and specifically, may be measured by the following four steps, which will be described in more detail in the following experimental examples.

(1) Preparation of sample: Particles of a super absorbent polymer to be measured are prepared. At this time, if measuring the convexity with respect to particles having a specific range of particle diameters, particles having a specific particle diameter are classified at 1.0 amplitude for 10 minutes by using a classifier of Retsch Company to prepare a sample.

At this time, particle diameters of the particles of a super absorbent polymer may be measured according to the method of EDANA WSP 220.3 of the European Disposables and Nonwovens Association (EDANA) standards.

(2) Image acquisition: The prepared sample is set on a stage in an instrument, and then scanned at a magnification of 2.5 to obtain images of individual particles.

(3) Image processing: For the acquired images, parameter values for each particle, such as an image obtained by capturing a 3D image of a 3-dimensional particle as a 2D image, a circle equivalent (CE) diameter, the shortest diameter, the longest diameter, and the circumference and convex hull perimeter of an actual particle, are measured.

(4) Based on the data analyzed for each particle, the convexity and CE diameter values of the entire particles included in the sample were obtained.

In order to obtain a super absorbent polymer satisfying the swelling factor, the convexity, and the like according to the present disclosure, the present inventors have adjusted manufacturing process conditions of the super absorbent polymer. For example, the super absorbent polymer of the present disclosure has been allowed to satisfy the swelling factor, the convexity, and the like by adjusting process conditions, such as adjusting the type or content of additives in a surface cross-linking process, or by adjusting polymerization and grinding process conditions.

For example, by adjusting the type and content of the monomer composition, and the type and amount of the internal cross-linking agent in the polymerization process, the type, introduction amount, and introduction timing of the surfactant, and the type, introduction amount, and introduction timing of the neutralizing agent in the micronization and neutralization steps, the type, rotation speed, hole size, and number of micronization times of a micronization device, it is possible to control such that the above-described swelling factor, convexity, and the like are satisfied.

In an aspect of the present disclosure, the content of extractable contents measured after free swelling the super absorbent polymer for 1 hours in water having an electrical conductivity of 100 μS/cm to 130 μS/cm may be 15 wt % or less, 14 wt % or less, 13 wt % or less, or 12 wt % or less based on the total weight of the super absorbent polymer. In addition, the smaller the value, the better the extractable contents, and although the lower limit thereof is theoretically 0 wt %, it may be, for example, 1 wt % or greater, 2 wt % or greater, or 3 wt % or greater.

If the elution amount of extractable contents in water having an electrical conductivity of 100 μS/cm to 130 μS/cm is at a predetermined level or below, it is possible to implement a super absorbent polymer having an excellent physical property balance by simultaneously improving absorption properties and permeability, which are the opposite properties, but if the content of extractable contents measured after free swelling the super absorbent polymer in water having an electrical conductivity of 100 μS/cm to 130 μS/cm is greater than 15 wt % based on the total weight of the super absorbent polymer, it cannot be said that cross-linking properties between polymer chains are excellent, and when coming into contact with the skin in a swollen state, the super absorbent polymer may cause discomfort or damage to the skin.

In an aspect of the present disclosure, the content of extractable contents measured after free swelling the super absorbent polymer for 16 hours with water having an electrical conductivity of 100 μS/cm to 130 μS/cm may be 25 wt % or less, 23 wt % or less, 21 wt % or less, or 19 wt % or less based on the total weight of the super absorbent polymer. In the same manner, the smaller the value, the better the extractable contents, and although the lower limit thereof is theoretically 0 wt %, it may be, for example, 1 wt % or greater, 2 wt % or greater, or 3 wt % or greater.

The amount of extractable contents eluted after free swelling the super absorbent polymer for 16 hours refers to the total content of extractable contents included in the super absorbent polymer.

When the content of extractable contents measured after free swelling the super absorbent polymer for 16 hours in water having an electrical conductivity of 100 μS/cm to 130

μS/cm is greater than 25 wt % based on the total weight of the super absorbent polymer, cross-linking is incomplete when polymerizing the super absorbent polymer, so that the centrifuge retention capacity and the absorbency under pressure, which are overall physical properties of the super absorbent polymer, may be significantly reduced.

The "extractable contents" refers to a compound in the form of a polymer not cross-linked in the process of preparing a super absorbent polymer, which may be generated due to incomplete cross-linking when the super absorbent polymer is polymerized, resulting in no cross-linking, or decomposition of a cross-linking agent during a chopping or drying process, or breakage of a main polymer chain.

The extractable contents may be eluted when the super absorbent polymer is exposed to a liquid, and the extractable contents mostly remain on the surface of the super absorbent polymer. Accordingly, the surface of the super absorbent polymer may become sticky, which may reduce permeability. This may cause a problem of unpleasant feeling when the super absorbent polymer is used in an actual product.

That is, a problem related to cross-linking of the super absorbent polymer may be confirmed by measuring the content of extractable contents eluted from a super absorbent polymer solution. That is, since the content of extractable contents is closely related to an inter-chain cross-linking structure in the super absorbent polymer, a high content of extractable contents means that the inter-chain cross-linking structure in the super absorbent polymer is incomplete.

Since the super absorbent polymer is widely used in hygiene products such as diapers, 0.9% brine, which has an ion concentration and an electrical conductivity similar to those of urine discharged from the body, is used to evaluate the amount of elution of extractable contents.

However, the super absorbent polymer is also widely used as a material for soil repair agents for horticulture, a civil engineering work, a construction index material, a seedling sheet, a freshness maintaining agent in a food distribution field, and a fomentation. In this case, it is necessary for extractable contents to have an excellent absorption behavior in water having an electrical conductivity of 100 μS/cm to 130 μS/cm.

That is, even if the same super absorbent polymer is used, the absorption behavior in water having an electrical conductivity of 100 μS/cm to 130 μS/cm and the absorption behavior in 0.9% bring having an electrical conductivity of about 16,100 μS/cm are bound to be different.

The content of extractable contents is closely related to the inter-chain cross-linking structure in the super absorbent polymer, and in the case of using 0.9% salt water, the volume at which the super absorbent polymer expands is small, so that the elution amount of extractable contents is small, but in the case of using water having an electrical conductivity of 100 μS/cm to 130 μS/cm, the super absorbent polymer expands more, thereby increasing the gap between chains in the super absorbent polymer, so that the elution amount of extractable contents increases, through which the correlation between the inter-chain cross-linking structure and the absorption behavior in the super absorbent polymer may be more accurately identified.

For example, even if two different super absorbent polymers have the same content of extractable contents in 0.9% salt water, the content of extractable contents thereof in water having an electrical conductivity of 100 μS/cm to 130 μS/cm may greatly vary depending on the cross-linking properties, and this is because the degree of cross-linking inside the super absorbent polymer affects the content of extractable contents.

For the above-described reason, it is not possible to directly compare results of experiments on the elution amount of extractable contents after free swelling using 0.9% salt water having an electrical conductivity of about 16,100 μS/cm and the absorption properties with results of experiments obtained after free swelling with water having an electrical conductivity of 100 μS/cm to 130 μS/cm as in the present disclosure.

That is, even if the same super absorbent polymer is used, the absorption behavior in water having an electrical conductivity of 100 μS/cm to 130 μS/cm and the absorption behavior in 0.9% salt water having an electrical conductivity of about 16,100 μS/cm are bound to be different, and accordingly, it is not possible to predict the content of extractable contents after free swelling with 0.9% salt water having an electrical conductivity of about 16,100 μS/cm by using the content of extractable contents after performing free swelling for 1 hour with water having an electrical conductivity of 100 μS/cm to 130 μS/cm, and vice versa.

Therefore, in order to implement a super absorbent polymer having an excellent physical property balance by simultaneously improving absorption properties and permeability, identifying the elution amount of extractable contents in water having an electrical conductivity of 100 μS/cm to 130 μS/cm may be independently meaningful separate from using 0.9% salt water having an electrical conductivity of about 16,100 μS/cm.

A method for measuring the content (wt %) of extractable contents in water having an electrical conductivity value of 100 μS/cm to 130 μS/cm will be described in more detail in the section of experimental examples to be described later.

The super absorbent polymer of the present disclosure may have a centrifuge retention capacity (CRC) in the range of about 33 g/g or greater, about 34 g/g or greater, or about 35 g/g or greater, and about 50 g/g or less, about 45 g/g or less, or about 40 g/g or less, as measured according to the method of EDANA WSP 241.3.

In addition, the super absorbent polymer of the present disclosure may have an absorbency under pressure (AUP) of 2.07 kPa (0.3 psi) in the range of about 25 g/g or greater, about 27 g/g or greater, about 28 g/g or greater, about 29 g/g or greater, or about 30 g/g or greater, and about 45 g/g or less, about 42 g/g or less, or about 40 g/g or less, as measured according to the method of EDANA WSP 242.3.

The super absorbent polymer of the present disclosure may have a vortex time of 40 seconds or less as measured by a vortex measurement method at 24.0° C.

More specifically, the vortex time may be 40 seconds or less, 35 seconds or less, 33 seconds or less, or 30 seconds or less. In addition, the smaller the value, the better the vortex time, and although the lower limit of the vortex time is theoretically second, it may be, for example, 10 seconds or more, 15 seconds or more, or 20 seconds or more.

A method for measuring the centrifuge retention capacity, the absorbency under pressure, and the vortex time of the super absorbent polymer will be described in more detail in the experimental examples to be described later.

In addition, when the super absorbent polymer of the present disclosure is swollen for 1 minute with water having an electrical conductivity value of 100 μS/cm to 130 μS/cm, the maximum capacity (free swell capacity) of water containable by the super absorbent polymer may be 170 g or more, 175 g or more, 180 g or more, or 185 g or more, and 230 g or less, 225 g or less, or 220 g or less. This is a numerical value showing the absorbency of the super absorbent polymer.

As described above, even if the same super absorbent polymer is used, the absorption behavior in water having an electrical conductivity of 100 μS/cm to 130 μS/cm and the absorption behavior in 0.9% bring having an electrical conductivity of about 16,100 μS/cm are bound to be different.

That is, it can be said that not only the content of extractable contents but also the absorbency such as the maximum capacity of water are independent of the use of water having an electrical conductivity value of 100 μS/cm to 130 μS/cm and the use of 0.9% brine having an electrical conductivity of about 16,100 μS/cm.

As water having a low ion concentration compared to the 0.9% brine, the present inventors used water having an electrical conductivity of about 1/100 of about 16,100 μS/cm, which is the electrical conductivity at 24° C. of 0.9% brine, to identify the maximum capacity of water containable by the super absorbent polymer, and in an aspect, water having an electrical conductivity of 110 μS/cm at 24° C. was used. In the case of water in the range of an electrical conductivity of 100 μS/cm to 130 μS/cm, there is no significant difference in absorption properties according to the electrical conductivity.

Accordingly, the present inventors have tried to develop a super absorbent polymer excellent in absorption rate and absorption capacity with respect to water having an ion concentration and an electrical conductivity lower than those of 0.9% brine, the water having an electrical conductivity of 100 μS/cm to 130 μS/cm, that is, about 1/100 of the electrical conductivity of 0.9% brine, and have implemented the super absorbent polymer by preparing the super absorbent polymer to satisfy the above-described swelling factor value.

A method for measuring the absorbency in water having an electrical conductivity value of 100 μS/cm to 130 μS/cm will be described in more detail in the section of experimental examples to be described later.

In an aspect of the present disclosure, the super absorbent polymer may have a gel strength of 0.7 N or greater, 0.8 N or greater, or 0.9 N or greater after the super absorbent polymer is swollen with 50 ml of brine in which 0.005% ASC is dissolved. In addition, the gel strength may be 1.5 N or less, 1.4 N or less, 1.3 N or less, 1.2 N or less, 1.1 N or less, or 1.0 N or less. Due to the high gel strength as described above, it is possible to reduce the amount of generation of fine powder caused by crushing and to reduce surface cross-linking damage, thereby exhibiting an effect of preventing the degradation in physical properties. In addition, even if the super absorbent polymer absorbs water and increases in volume, the super absorbent polymer may maintain the shape well, and as a result, may exhibit improved absorbency and permeability. A method for measuring the gel strength of the super absorbent polymer will be described in more detail in the section of experimental examples to be described later.

The super absorbent polymer according to the present disclosure may be implemented by appropriately adjusting manufacturing process conditions such as components/content of the super absorbent polymer, polymerization process conditions, or pulverization process conditions of the super absorbent polymer. That is, by adjusting the above-described process conditions, it is possible to prepare a super absorbent polymer having an expansion factor value of a predetermined value.

For example, by adjusting the type and content of the monomer composition, and the type and amount of the internal cross-linking agent in the polymerization process, the type, introduction amount, and introduction timing of the surfactant, and the type, introduction amount, and introduction timing of the neutralizing agent in the micronization and neutralization steps, the type, rotation speed, hole size, and number of micronization times of a micronization device, it is possible to control such that the super absorbent polymer has an expansion factor value of a predetermined value.

Hereinafter, each component constituting the super absorbent polymer will be described in more detail.

A polyacrylic acid (salt)-based super absorbent polymer of an aspect of the disclosure includes a base polymer including a water-soluble ethylene-based unsaturated monomer having an acid group and a cross-linked polymer of an internal cross-linking agent. The cross-linked polymer may preferably be formed by polymerizing a monomer composition which includes components such as a monomer, an internal cross-linking agent, a polymerization initiator, and the like.

Here, the water-soluble ethylene-based unsaturated monomer may be any monomer commonly used in the preparation of a super absorbent polymer. As a non-limiting example, the water-soluble ethylene-based unsaturated monomer may be a compound represented by Formula 1 below.

[Formula 1]

$$R\text{—}COOM'$$

In Formula 1 above, R is an alkyl group having 2 to 5 carbon atoms including an unsaturated bond, and M' is a hydrogen atom, a monovalent or divalent metal, an ammonium group, or an organic amine salt.

Preferably, the monomer may be a (meth)acrylic acid, and one or more selected from the group consisting of a monovalent (alkali) metal salt, a divalent metal salt, an ammonium salt, and organic amine salt of these acids.

If the (meth)acrylic acid and/or a salt thereof is used as the water-soluble ethylene-based unsaturated monomer as described above, it is advantageous in terms of obtaining a super absorbent polymer with improved absorbency. In addition, as the monomer, maleic anhydride, fumaric acid, crotonic acid, itaconic acid, 2-acryloylethane sulfonic acid, 2-methacryloylethanesulfonic acid, 2-(meth)acryloylpropanesulfonic acid or 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth) acrylamide, or the like may be used.

The water-soluble ethylene-based unsaturated monomer has an acid group. Meanwhile, in the preparation of the super absorbent polymer, at least a portion of the acid group forms a polymer by cross-linking a monomer neutralized by a neutralizing agent, but in the present disclosure, the acid group may preferably be neutralized not during polymerization, but after the formation of a polymer. More specific details on this will be provided in the section on a method for preparing a super absorbent polymer.

The concentration of the water-soluble ethylene-based unsaturated monomer in the monomer composition may be appropriately adjusted in consideration of polymerization time, reaction conditions, etc., and may be about 20 wt % to about 60 wt %, or about 20 wt % to about 40 wt %.

As used herein, the term “internal cross-linking agent” is a term used to distinguish the same from a surface cross-linking agent for performing cross-linking on the surface of super absorbent polymer particles to be described later, and an internal cross-linking agent serves to form a polymer including a cross-linking structure by introducing a cross-linking bond between unsaturated bonds of the above-described water-soluble ethylene-based unsaturated monomers.

The cross-linking in the above step is performed without distinction between the surface and the inside, but if a surface cross-linking process of the super absorbent polymer particles to be described later is performed, the surfaces of finally prepared super absorbent polymer particles may include a structure newly cross-linked by the surface cross-linking agent, and the inside of the super absorbent polymer particles may maintain a structure cross-linked by the internal cross-linking agent.

According to an aspect of the present disclosure, the internal cross-linking agent may include one or more of a polyfunctional acrylate-based compound, a polyfunctional allyl-based compound, or a polyfunctional vinyl-based compound.

Non-limiting examples of the polyfunctional acrylate-based compound may include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth)acrylate, butylene glycol di(meth)acrylate, hexanediol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, trimethylolpropane di(meth)acrylate, trimethylolpropane tri(meth)acrylate, glycerin di(meth)acrylate, glycerin tri(meth)acrylate, and the like, and any one thereof may be used alone, or two or more thereof may be mixed and used.

Non-limiting examples of the polyfunctional allyl-based compound may include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropyleneglycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, glycerin triallyl ether, and the like, and any one thereof may be used alone, or two or more thereof may be mixed and used.

Non-limiting examples of the polyfunctional vinyl-based compound may include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, glycerin trivinyl ether, and the like, and any one thereof may be used alone or two or more thereof may be mixed and used. Preferably, pentaerythritol triallyl ether may be used.

In the above-described polyfunctional allyl-based compound, or the polyfunctional vinyl-based compound, two or more unsaturated groups included in a molecule may be respectively bonded to unsaturated bonds of the water-soluble ethylene-based unsaturated monomers or unsaturated bonds of another internal cross-linking agent, thereby forming a cross-linking structure during a polymerization process, and unlike an acrylate-based compound including an ester bond (—(C=O)O—) in a molecule, may maintain cross-linking bonds more stably even during a neutralization process to be described later after the polymerization reaction.

Accordingly, the gel strength of a prepared super absorbent polymer may increase, the process stability may increase during a discharge process after polymerization, and the amount of extractable contents may be reduced to a minimum.

Cross-linking polymerization of the water-soluble ethylene-based unsaturated monomer in the presence of the above-described internal cross-linking agent may be performed in the presence of a polymerization initiator, and if necessary, a thickener, a plasticizer, a preservation stabilizer, an antioxidant, and the like.

In the monomer composition, the above-described internal cross-linking agent may be used in an amount of 0.01 parts by weight to 5 parts by weight based on 100 parts by weight of the water-soluble ethylene-based unsaturated monomer. For example, the internal cross-linking agent may be used in an amount of 0.01 parts by weight or greater, 0.05 parts by weight or greater, or 0.1 parts by weight or greater, and 5 parts by weight or less, 3 parts by weight or less, 2 parts by weight or less, 1 part by weight or less, or 0.7 parts by weight or less. If the content of the internal cross-linking agent is too low, cross-linking is not sufficiently achieved, so that it may be difficult to implement strength of an appropriate level or above, and if the content of the internal cross-linking agent is too high, the internal cross-linking density increases, so that it may be difficult to implement a desired centrifuge retention capacity. Particularly, when in the above-described range, it is suitable to implement such that the super absorbent polymer according to the present disclosure has an expansion factor equal to or greater than a predetermined value.

If the internal cross-linking agent is used in a small content to allow the base polymer to have a high centrifuge retention capacity (CRC), the gel strength of a prepared polymer may be lowered, and due to the low gel strength, it may be difficult to operate a chopper and the like when chopping a hydrogel polymer. In this case, two or more types of internal cross-linking agents may be mixed and used for the operation of a high-speed rotating chopper and the like to increase the gel strength, thereby increasing the operating stability of the chopping and the like.

The shape of particles of the formed hydrogel polymer may change depending on the degree of internal cross-linking, and a polymer formed using such an internal cross-linking agent may have a three-dimensional network structure in the form in which main chains formed by the polymerization of the water-soluble ethylene-based unsaturated monomers are cross-linked by the internal cross-linking agent.

As described above, if a polymer has a three-dimensional network structure, the centrifuge retention capacity and the absorbency under pressure, which are overall physical properties of a super absorbent polymer, may be significantly improved compared to having a two-dimensional linear structure in which additional cross-linking is not performed by an internal cross-linking agent.

The polymer is prepared by polymerizing a monomer and an internal cross-linking agent in the presence of a polymerization initiator, and the type of the polymerization initiator is not particularly limited, but preferably, the polymerization may be performed using a thermal polymerization method in a batch reactor, and accordingly, a thermal polymerization initiator may be used as the polymerization initiator.

As the thermal polymerization initiator, one or more selected from the group consisting of a persulfate-based initiator, an azo-based initiator, and an initiator composed of hydrogen peroxide and ascorbic acid may be used. Specifically, examples of the persulfate-based initiator include sodium persulfate ($Na_2S_2O_8$), potassium persulfate ($K_2S_2O_8$), ammonium persulfate ($(NH_4)_2S_2O_8$), and the like, and examples of the azo-based initiator include 2,2-azobis(2-amidinopropane) dihydrochloride, 2,2-azobis-(N, N-dimethylene) isobutyramidine dihydrochloride, 2-(carbamoylazo) isobutylonitril, 2,2-azobis [2-(2-imidazolin-2-yl) propane] dihydrochloride, 4,4-azobis-(4-cyanovaleric acid), and the like. More various thermal polymerization initiators are well specified on p203 of 'Principle of Polymerization (Wiley, 1981)' written by Odian, and are not limited to the above-described examples.

The above-described polymerization initiator may be used in an amount of 2 parts by weight or less based on 100 parts by weight of the water-soluble ethylene-based unsaturated monomer. That is, if the concentration of the polymerization initiator is too low, it is not preferable in that the polymerization rate may decrease, and remaining monomers may be extracted in a large amount in a final product. On the contrary, if the concentration of the polymerization initiator is higher than the above-described range, it is not preferable in that polymer chains forming a network is shortened, thereby degrading the physical properties of a polymer, such as increasing the content of extractable contents and lowering the absorbency under pressure.

In an aspect of the present disclosure, the above-described polymerization initiator and a reducing agent forming a redox couple may be introduced together to the monomer composition to initiate polymerization.

Specifically, the initiator and the reducing agent react with each other when introduced to a polymer solution and form radicals.

The formed radicals react with the monomer, and since an oxidation-reduction reaction between the initiator and the reducing agent is highly reactive, polymerization is initiated even when only a trace amount of the initiator and the reducing agent are introduced, so that it is not necessary to increase the process temperature, thereby allowing low-temperature polymerization, and it is possible to minimize changes in physical properties of the polymer solution.

The polymerization reaction using the oxidation-reduction reaction may smoothly occur even at a temperature near or below room temperature (25° C.). For example, the polymerization reaction may be performed at a temperature of 5° C. to 25° C. or 5° C. to 20° C.

In an aspect of the present disclosure, if a persulfate-based initiator is used as the initiator, the reducing agent may be one or more selected from the group consisting of sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, and disodium 2-hydroxy-2-sulfinoacteate.

As an example, potassium persulfate may be used as the initiator, and disodium 2-hydroxy-2-sulfinoacteate may be used as the reducing agent, ammonium persulfate may be used as the initiator, and tetramethylammoniumdiamine may be used as the reducing agent, sodium persulfate may be used as the initiator, and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid, sucrose, sodium sulfite ($Na_2SO_3$), sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, disodium 2-hydroxy-2-sulfinoacteate, and disodium 2-hydroxy-2-sulfoacteate.

The above-described monomer composition may further include an additive such as a thickener, a plasticizer, a preservation stabilizer, an antioxidant, or the like, if necessary.

In addition, the monomer composition including monomers may be, for example, in the state of a solution dissolved in a solvent such as water, and the content of solids in the monomer composition of the above-described solution state, i.e., the concentration of the monomers, the internal cross-linking agent, and the polymerization initiator, may be adjusted appropriately in consideration of the polymerization time, reaction conditions, etc. For example, the content of solids in the monomer composition may be 10 wt % to 80 wt %, 15 wt % to 60 wt %, or 30 wt % to 50 wt %.

A solvents that may be used at this time may be used without limitation in composition as long as the solvent can dissolve the above-mentioned components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methyl cellosolve acetate, N,N-dimethylacetamide, and the like may be used in combination.

The polymer obtained by the above-described method may form a polymer having a high molecular weight and a uniform molecular weight distribution by performing polymerization by using an ethylene-based unsaturated monomer in an unneutralized state. As a result, the content of water-soluble components is reduced, which may improve the performance of the super absorbent polymer.

In addition, the polymer may have a moisture content of 30 wt % to 80 wt %. For example, the moisture content of the polymer may be 30 wt % or greater, 45 wt % or greater, or 50 wt % or greater, and 80 wt % or less, 70 wt % or less, or 60 wt % or less.

If the moisture content of the polymer is too low, it is difficult to obtain an appropriate surface area in a pulverization step, so that effective pulverization may not be achieved, and if the moisture content of the polymer is too high, a pressure applied in the pulverization step may increase, so that it may be difficult to perform pulverization to a desired particle size.

Throughout the present specification, the term "moisture content" refers to a value obtained by subtracting the weight of a polymer in a dry state from the weight of the polymer by the content of moisture occupying with respect to the total weight of the polymer. Specifically, the moisture content is defined as a value calculated by measuring the weight loss due to moisture evaporation from a polymer during a drying process performed by raising the temperature of the polymer in a crumb state through infrared heating. At this time, conditions of the drying are to increase the temperature from room temperature to about 180° C. and then maintain the temperature at 180° C., and the total drying time is set to 40 minutes, including 5 minutes for raising the temperature, and then the moisture content is measured.

The super absorbent polymer according to an aspect of the present disclosure includes the above-described base polymer powder containing the water-soluble ethylene-based unsaturated monomer having an acid group and the cross-linked polymer of an internal cross-linking agent, and a surface cross-linked layer formed on the base polymer powder by further cross-linking the cross-linked polymer by means of a surface cross-linking agent.

The surface cross-linked layer is formed on at least a portion of the surface of the base polymer powder, and may be formed by further cross-linking the cross-linked polymer included in the base polymer powder by means of the surface cross-linking agent.

As the surface cross-linking agent, any surface cross-linking agent used in the preparation of a super absorbent polymer may be used without particular limitation. For example, the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol, at least one carbonate-based compound selected from the group consisting of ethylene carbonate, propylene carbonate, and glycerol carbonate, an epoxy compound such as ethylene glycol diglycidyl ether, an oxazoline compound such as oxazolidinone, a polyamine compound, a mono-, di- or polyoxazolidinone compound, a cyclic urea compound, or the like.

Specifically, one or more, two or more, or three or more of the above-described surface cross-linking agents may be used as the surface cross-linking agent, and for example, ethylene carbonate-propylene carbonate (ECPC), propylene glycol, and/or glycerol carbonate may be used.

The above-described surface cross-linking agent may be used in an amount of about 0.001 parts by weight to about 5 parts by weight based on 100 parts by weight of the super absorbent polymer particles. For example, the surface cross-linking agent may be used in an amount of 0.005 parts by weight or greater, 0.01 parts by weight or greater, or 0.05 parts by weight or greater, and 5 parts by weight or less, 4 parts by weight or less, or 3 parts by weight or less based on 100 parts by weight of the super absorbent polymer particles. The content range of the surface cross-linking agent may be adjusted to be within the above-described range to prepare a super absorbent polymer exhibiting excellent overall absorption physical properties. Particularly, when in the above-described range, it is suitable to implement such that the super absorbent polymer according to the present disclosure has an expansion factor equal to or greater than a predetermined value.

In addition, the surface cross-linked layer may be formed by adding an inorganic material to the surface cross-linking agent. That is, in the presence of the surface cross-linking agent and the inorganic material, the surface cross-linked layer may be formed by further cross-linking the surface of the base polymer powder.

As the above-described inorganic material, one or more inorganic materials selected from the group consisting of silica, clay, alumina, a silica-alumina composite, titania, a zinc oxide, and an aluminum sulfate may be used. The above-described inorganic material may be used in a powder form or a liquid form, and particularly, may be used as alumina powder, silica-alumina powder, titania powder, or a nano-silica solution. In addition, the inorganic material may be used in an amount of about 0.001 parts by weight to about 1 part by weight based on 100 parts by weight of super absorbent polymer particles.

As described above, the super absorbent polymer including the base polymer powder and the surface cross-linked layer formed on the base polymer powder may absorb body fluids or water at a high speed, and also, may absorb a relatively large amount thereof in the beginning, and thus, may prevent a problem such as accumulation of the body fluids or the water without being absorbed, or the leakage thereof to the outside.

II. Method for Preparing Super Absorbent Polymer

A typical super absorbent polymer is prepared in the presence of an internal cross-linking agent and a polymerization initiator by cross-linking polymerizing a water-soluble ethylene-based unsaturated monomer to form a hydroxyl gel polymer, drying the hydroxyl gel polymer thus formed, and then pulverizing the same to a desired particle size, and typically, at this time, in order to facilitate the drying of the hydroxyl gel polymer, and to increase the efficiency of the pulverization process, a chopping process is performed in which the hydroxyl gel polymer is cut into particles having a size of several millimeters prior to the drying process. However, in the above-described chopping process, due to the adhesiveness of the hydrogel polymer, the hydrogel polymer is not pulverized to a micro-size particle level and becomes an aggregated gel form. When the hydrogel polymer in the form of the aggregated gel is dried, a plate-shaped dried body is formed, and in order to pulverize the same to a micro-size particle level, a pulverization process may be performed to reduce the adhesiveness of the multi-stage polymer, wherein there has been a problem in which a large amount of fine powder is generated in the process.

In order to solve the above-described problem, a method in which the separated fine powder is reused by being mixed with an appropriate amount of water to be re-assembled, and then being introduced in a chopping step or a pre-drying step. However, in the process of reusing the fine powder, there has been a problem of causing an increase in equipment load and/or energy usage. In addition, remaining fine powder that has not been classified even after the reuse causes degradation in the physical properties of a super absorbent polymer.

As a result of repeated research for solving the above-described problem, it has been confirmed that, instead of performing polymerization in a state in which an acid group of a water-soluble ethylene-based unsaturated monomer is neutralized as in a typical method for preparing a super absorbent polymer, if polymerization is first performed to form a polymer in a state in which an acid group is not neutralized, and the hydrogel polymer is micronized in the presence of a surfactant, followed by neutralizing an acid group of the polymer, the acid group of the polymer is neutralized to form a hydrogel polymer, and then the hydrogel polymer is micronized in the presence of a surfactant, or the acid group present in the polymer is neutralized at the same time as micronization, the surfactant is present in a large amount on the surface of the polymer, and is allowed to sufficiently serve to lower high adhesiveness of the polymer, thereby preventing the polymer from being excessively aggregated, and to control the aggregation status to a desired level.

The super absorbent polymer according to the present disclosure may be implemented by adjusting components and contents of the polymer, polymerization conditions, or pulverization process conditions. For example, by adjusting the type and content of the monomer composition, and the type and amount of the internal cross-linking agent in the polymerization process, the type, introduction amount, and introduction timing of the surfactant, and the type, introduction amount, and introduction timing of the neutralizing agent in the micronization and neutralization steps, the type, rotation speed, hole size, and the number of times of micronization of a micronization device, the composition and content of the surface cross-linking solution, and the like, it is possible to control such that the super absorbent polymer has an expansion factor value of a predetermined value.

Particularly, in the process of preparing the super absorbent polymer, when the polymerization process, the micronization process, and the surface cross-linking process are performed, it is possible to control such that the super absorbent polymer has an expansion factor value of a predetermined value by adjusting the neutralization timing and polymerization conditions, whether the ultra-fine pulverization process is applied, adjusting the component and content of the surface cross-linking solution, adjusting the hole size, or adjusting the number of times of the micronization.

Hereinafter, a method for preparing a super absorbent polymer according to one aspect will be described in more detail for each step.

Step 1: Polymerization Step

First, polymerization is performed on a monomer composition including a water-soluble ethylene-based unsaturated monomer having an acid group and an internal cross-linking agent to prepare base polymer powder in which the water-soluble ethylene-based unsaturated monomer having an acid group and the internal cross-linking agent are cross-linking polymerized.

The above-described step may include mixing the water-soluble ethylene-based unsaturated monomer having and acid group, the internal cross-linking agent, and a polymerization initiator to prepare a monomer composition and polymerizing the monomer composition to form a polymer.

Here, the same contents described with reference to the super absorbent polymer of Item I above may be equally applied to each component.

The water-soluble ethylene-based unsaturated monomer has an acid group. As described above, in the preparation of a typical super absorbent polymer, the monomer in which at least a portion of an acid group has been neutralized by a neutralizing agent is cross-linked to form a polymer. Specifically, in the step of mixing the water-soluble ethylene-based unsaturated monomer having an acid group, the internal cross-linking agent, the polymerization initiator, and the neutralizing agent, at least a portion of the acid group of the water-soluble ethylene-based unsaturated monomer has been neutralized.

However, according to an aspect of the present disclosure, a polymer is formed by performing polymerization first in a state in which the acid group of the water-soluble ethylene-based unsaturated monomer is not neutralized.

The water-soluble ethylene-based unsaturated monomer (e.g., acrylic acid) in a state in which the acid group is not neutralized is in a liquid state at room temperature and has high miscibility with a solvent (water), thereby being present in a mixed solution state in a monomer composition. However, the water-soluble ethylene-based unsaturated monomer in which the acid group is neutralized is in a solid state at room temperature, has different solubility depending on the temperature of a solvent (water), and has lower solubility as a lower temperature.

The water-soluble ethylene-based unsaturated monomer in which the acid group is not neutralized has higher solubility or miscibility with respect to a solvent (water) than a monomer in which an acid group is neutralized, and thus, is not precipitated even at a low temperature, and accordingly, is advantageous in long-term polymerization at a low temperature. Accordingly, it is possible to stably form a polymer having a higher molecular weight and a uniform molecular weight distribution by performing long-term polymerization using the water-soluble ethylene-based unsaturated monomer in a state in which the acid group is not neutralized.

In addition, it is possible to form a polymer with a longer chain, so that an effect of reducing the content of extractable contents present in a uncross-linked state due to incomplete polymerization or cross-linking may be achieved, and accordingly, it is suitable to implement such that the super absorbent polymer has an expansion factor value of a predetermined value.

In addition, as described above, if polymerization is first performed to form a polymer in a state in which an acid group of a monomer is not neutralized, and the polymer is neutralized, and then micronized in the presence of a surfactant, micronized in the presence of a surfactant and then polymerized, or micronized simultaneously with neutralizing an acid group present in the polymer, the surfactant is present in a large amount on the surface of the polymer to sufficiently serve to lower the adhesiveness of the polymer.

According to an aspect of the present disclosure, the step of performing polymerization on the monomer composition to form a polymer may be performed for 1 chour or more in a batch-type reactor.

In a typical method for preparing a super absorbent polymer, the polymerization method is largely divided into thermal polymerization and photopolymerization depending on a polymerization energy source, and typically, the thermal polymerization may be performed in a reactor with a stirring shaft such as a kneader, and the photopolymerization may be performed in a flat-bottomed vessel.

If the polymerization is performed as continuous polymerization, for example, if polymerization is performed in a reactor having a conveyor belt, a new monomer composition is supplied to the reactor as a polymerization product moves, thereby achieving polymerization in a continuous manner, so that polymers having different polymerization rates are mixed, and accordingly, it is difficult to achieve even polymerization in the entire monomer composition, which may cause degradation in the overall physical properties.

However, according to an aspect of the present disclosure, polymerization is performed in a stationary manner in a batch reactor, so that there is less risk of mixing polymers with different polymerization rates, and accordingly, a polymer having uniform quality may be obtained.

In addition, the above-described polymerization step is performed in a batch reactor having a predetermined volume, and performs a polymerization reaction for a long period of time, for example, 1 hour or more, 3 hours or more, or 6 hours or more, compared to a case in which polymerization is performed in a continuous manner in a reactor having a conveyor belt. Despite the long polymerization reaction time as described above, since polymerization is performed on a water-soluble ethylene-based unsaturated monomer in an unneutralized state, the monomer is not easily precipitated even when the polymerization is performed for a long period of time, and therefore, it is advantageous for long-term polymerization.

The polymerization in a batch reactor of the present disclosure is performed by a thermal polymerization method, so that a thermal polymerization initiator is used as the polymerization initiator, and the description of the corresponding component is the same as described above.

Steps 2 to 3: Micronization and Neutralization Steps

Next, a step of micronizing the hydrogel polymer in the presence of a surfactant to prepare a mixture including the micronized hydrogel polymer (Step 2) is included.

The above-described micronization step is a step of micronizing the polymer in the presence of a surfactant, and is a step in which micronization and aggregation of the polymer into a size of tens to hundreds of micrometers are simultaneously performed, rather than chopping the polymer to a millimeter size.

That is, it is a step of imparting appropriate adhesiveness to the polymer, thereby preparing secondary aggregated particles in the shape in which primary particles micronized to a size of tens to hundreds of micrometers are aggregated. Hydrous super absorbent polymer particles, which are the secondary aggregated particles prepared in the above-described step have a normal particle size distribution and a greatly increased surface area, so that the absorption rate may be significantly improved.

If ultra-fine pulverization is performed at a rotation speed of 500 rpm to 4,000 rpm by applying high-intensity mechanical shearing force in the micronization step, it is possible to form aggregated hydrogel particles having finer micropores.

At this time, if ultra-fine pulverization is performed at a rotation speed of 500 rpm to 4,000 rpm, high-intensity mechanical shearing force is applied, so that micropores of 100 μm or less are easily formed on the polymer, and accordingly, the surface roughness is increased, and the total surface area of the polymer is significantly increased by the pores formed inside and outside the polymer particles. Since the micropores are formed in a shape having stability compared to pores formed using a foaming agent in the polymerization step, the degree of fine powder generation due to the corresponding pores may be significantly reduced in the following process. Super absorbent polymer particles prepared in the above-described step have a significantly increased surface area, so that the absorption rate may be significantly improved, and accordingly, it is suitable to implement such that the super absorbent polymer of the present disclosure has an expansion factor value of a predetermined value.

The ultra-fine pulverization process is performed at a rotation speed of 500 rpm to 4,000 rpm, and if the rotation speed of the above-described process is less than 500 rpm, it is difficult to form sufficient pores to a desired degree, so that it is difficult to expect quick vortex time, and it is difficult to secure a desired level of productivity. In addition, if the rotation speed is greater than 4,000 rpm, polymer chains may be damaged due to excessive shearing force, and accordingly, the content of extractable contents is increased, so that overall physical properties of a prepared super absorbent polymer may be slightly degraded. Preferably, the ultra-fine pulverization process may be performed at 1,000 rpm to 3,500 rpm, or 2,000 rpm to 3,000 rpm. In the above-described range, it is easy to form desired micropores without any problem described above.

According to an aspect of the present disclosure, the micronization step is performed by a micronization device, and the micronization device may include a body part having a transfer space thereinside, in which a polymer is transferred, a screw member rotatably installed inside the transfer space to move a polymer, a drive motor providing a rotational driving force to the screw member, a cutter member installed in the body part and pulverizing the polymer, and a perforated plate discharging the polymer pulverized by the cutter member to the outside of the body part and having a plurality of holes.

At this time, the size of the hole provided in the perforated plate of the micronization device may be 1 mm to 25 mm, 5 mm to 20 mm, or 5 mm to 15 mm.

As described above, when the polymer mixed with the surfactant is micronized using the micronization device while controlling aggregation, a smaller particle size distribution is implemented, so that the following drying and pulverization processes may be performed under milder conditions, and accordingly, it is possible to improve the physical properties of the super absorbent polymer while preventing the generation of fine powder, and if the ultra-fine pulverization is performed, appropriate micropores are simultaneously formed on the surface of the polymer, so that absorption rate may be improved through the improvement in the surface area.

The micronization step may be performed one or more times, and preferably, may be performed 1 time to 6 times, 1 time to 4 times, or 1 time to 3 times. The above-described step may be performed using a plurality of micronization devices, or may be performed using a single micronization device including a plurality of perforated plates and/or a plurality of cutter members, or some devices of the plurality of micronization devices may include a plurality of perforated plates and/or a plurality of cutter members.

According to an aspect of the present disclosure, a surfactant may be additionally used in the above-described micronization step, and accordingly, aggregation between polymer particles may be effectively controlled to lower the load of the device used in the pulverization process, so that productivity may be further improved.

The surfactant may be selected from compounds represented by Formula 2-1 to Formula 2-14 below, but is not limited thereto.

[Formula 2-1]

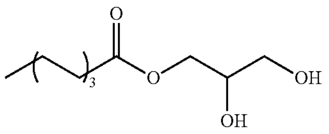

[Formula 2-2]

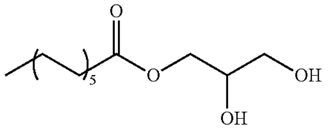

[Formula 2-3]

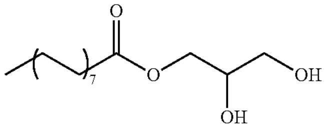

-continued

[Formula 2-4]

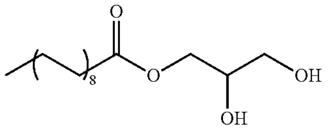

[Formula 2-5]

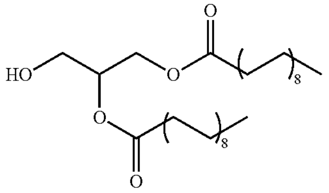

[Formula 2-6]

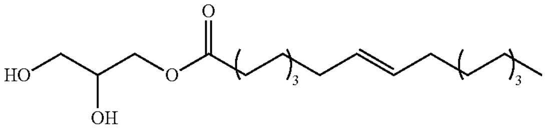

[Formula 2-7]

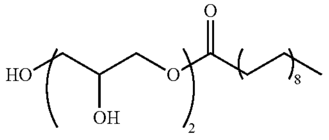

[Formula 2-8]

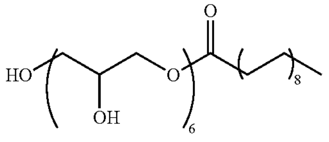

[Formula 2-9]

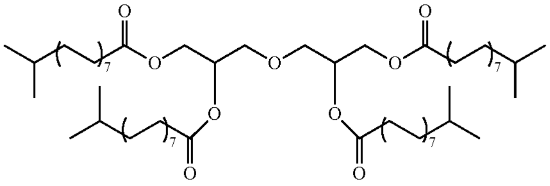

[Formula 2-10]

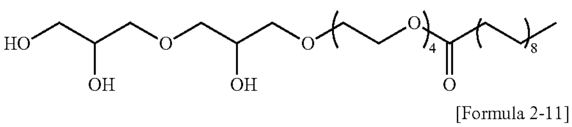

[Formula 2-11]

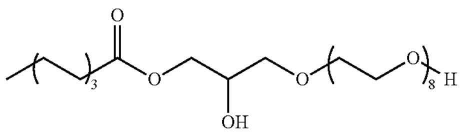

[Formula 2-12]

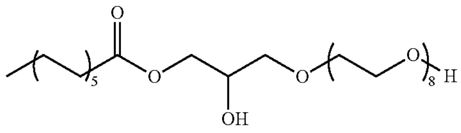

[Formula 2-13]

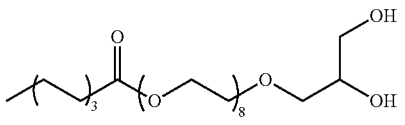

-continued

[Formula 2-14]

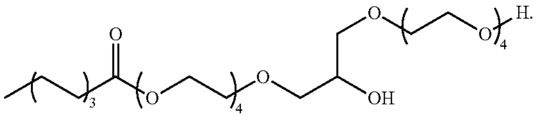

The amount of the surfactant to be used is not particularly limited, but the surfactant may be used in an amount of 0.06 g to 0.48 g per 1,000 g of the hydrogel polymer depending on productivity securing or the load of a device.

If the surfactant is used too little, the surfactant is not evenly adsorbed onto the surface of the polymer, so that particles may re-aggregated after pulverization, or due to much sharing between the surfactant and the polymer, absorption performance such as centrifuge retention capacity and absorbency under pressure may be degraded. Meanwhile, if the surfactant is used too much, due to a decrease in surface tension, the overall physical properties of a finally prepared super absorbent polymer may be degraded.

Therefore, for example, the surfactant may be used in an amount of 0.06 g or more, 0.1 g or more, or 0.2 g or more, and 0.48 g or less, 0.45 g or less, or 0.4 g or less per 1,000 g of the hydrogel polymer. In this case, it is easy to control such that the super absorbent polymer has an expansion factor value of a predetermined value.

A method for mixing a surfactant with a polymer is not particularly limited as long as it is a method capable of evenly mixing the surfactant with the polymer, and may be appropriately adopted and used. Specifically, the surfactant may be mixed in a dry manner, or dissolved in a solvent and then mixed in a solution state, or the surfactant may be melted and then mixed.

Among the above, the surfactant may be, for example, mixed in a solution state of being dissolved in a solvent. At this time, as the solvent, all types of solvents may be used whether it is an inorganic solvent or organic solvent, but considering the ease of a drying process and the cost of a solvent recovery system, water is most suitable. In addition, the solution may be prepared by mixing the surfactant and the polymer in a reaction tank, putting the polymer in a mixer and spraying the solution thereon, or mixing the polymer and the solution by continuously supplying the same to a continuously operating mixer.

If the surfactant is mixed in a solution state of being dissolved in water, the surfactant may be diluted as an aqueous solution having a concentration of about 0.01% to 90% and used.

For example, if the surfactant is to be used in an amount of 0.1 g per 1,000 g of the hydrogel polymer, 100 g of an aqueous solution having a concentration of 0.1% may be used by dissolving 0.1 g of the surfactant in 99.9 g of water. Alternatively, 10 g of an aqueous solution having a concentration of 1% may be used by dissolving 0.1 g of the surfactant in 9.9 g of water.

That is, if the same amount of the surfactant is used, the water content may be adjusted to prepare an aqueous solution with a desired concentration, and the concentration may be appropriately adjusted in consideration of the physical properties of a super absorbent polymer to be finally prepared.

According to an aspect of the disclosure, a step of neutralizing at least a portion of the acid group of the polymer (Step 3) is performed, and the above-described micronization of Step 2 and the neutralization of Step 3 may be performed sequentially, alternately, or simultaneously.

That is, a neutralizing agent may be introduced to a polymer to polymerize the acid group first, and then a surfactant may be introduced to the polymerized polymer to micronize the polymer mixed with the surfactant (perform in the order of Step 3->Step 2), or a neutralizing agent and a surfactant may be simultaneously introduced to a polymer to neutralize and micronize the polymer (simultaneously perform Steps 2 and Step 3). Alternatively, a surfactant may be introduced first and then a neutralizing agent may be introduced later (perform in the order of Step 2->Step 3). Alternatively, a neutralizing agent and a surfactant may be alternately introduced. Alternatively, a surfactant may be introduced first for micronization, and then a neutralizing agent may be introduced for neutralization, and additionally, a surfactant may be further added to the neutralized hydrogel polymer to further perform the micronization process.

Here, if the neutralization is separately performed independently from the micronization of Step 2, the neutralization may be performed in such a manner that an additive is introduced while the polymer is being pulverized. More specifically, a screw-type extruder including a perforated plate having a plurality of holes may be used. The screw-type extruder is a device in which pulverization is performed in a mild condition compared to the micronization device used in the micronization step described above, and the rotation speed of the extruder may be about 150 rpm to about 500 rpm, and the hole of the perforated plate may be about 3 mm to 25 mm in size, but the present disclosure is not limited thereto.

The rotation speed of the screw-type extruder and the hole size of the perforated plate affect the discharge state of a super absorbent polymer discharged from the extruder, and depending on the discharge state, the particle shape of the super absorbent polymer may change.

Particularly, by adjusting the rotation speed of the screw-type extruder at 150 rpm to 500 rpm, it is possible to control such that the super absorbent polymer has an expansion factor value of a predetermined value.

At this time, as the neutralizing agent, a basic material such as sodium hydroxide, potassium hydroxide, ammonium hydroxide, or the like, which is capable of neutralizing an acid group, may be used.

In addition, the degree of neutralization which refers to the degree of neutralization of an acid group included in the polymer by the neutralizing agent may be 50 mol % to 90 mol %, 60 mol % to 85 mol %, 65 mol % to 85 mol %, or 65 mol % to 80 mol %. The range of the degree of neutralization may vary depending on final physical properties, and by adjusting the degree of neutralization, it is possible to adjust absorption rate and absorption performance.

At this time, if the degree of neutralization is too high, the absorbency of the super absorbent polymer may decrease, and the concentration of the carboxyl group on the surface of the particle is too low, making it difficult to properly perform surface cross-linking in a subsequent process, so that absorption properties under pressure or permeability may be reduced. On the other hand, if the degree of neutralization is too low, the polymer may have significantly reduced absorption power, and may exhibit the same property as that of elastic rubber, which is difficult to handle.

In order to neutralize the entire polymer evenly, it may be preferable to leave a certain time lag between the introduction of the neutralizing agent and the micronization process.

Step 4: Drying Step

Next, a step (Step 4) of drying the micronized and neutralized polymer to prepare base polymer powder is performed.

The above-described step is a step in which at least a portion of an acid group of a polymer is neutralized, and moisture of the base polymer powder, which is a polymer obtained by micronizing the polymer, is dried.

In a typical method for preparing a super absorbent polymer, the drying step is performed such that the moisture content of base polymer powder is to be about 4 wt % to 20 wt %, about 4 wt % to about 15 wt %, or about 6 wt % to about 13 wt %. However, the present disclosure is not limited thereto.

Step 4 above may be performed by fixed-bed type drying, moving type drying, or a combination thereof.

According to an aspect of the disclosure, Step 4 above may be performed by fixed-bed type drying.

The fixed-bed type drying refers to a method in which a material to be dried is suspended on a floor such as a perforated iron plate which allows air to pass through, and then hot air passes through the material from the bottom to the top to dry the material.

The fixed-bed type drying performs drying in a plate-shape manner without the flow of particles, so that it is difficult to achieve uniform drying with a simple flow of hot air. Therefore, the fixed-bed type drying may include a delicate adjustment of hot air and temperature in order to obtain a dried body with a uniform high moisture content. In the present disclosure, through a method for changing the direction of hot air from downward to upward, a plate-shaped dried body is prevented from bending during drying, thereby preventing the hot air from escaping. In addition, the drying temperature was changed for each section to adjust the upper layer-middle layer-lower layer inside the dried body to be uniformly dried with a moisture content deviation of 5% or less.

As a device capable of performing drying by the fixed-bed type drying, a belt-type dryer or the like may be used, but the present disclosure is not limited thereto.

In the case of the fixed-bed type drying step, the drying process may be performed at a temperature of about 80° C. to about 200° C., preferably 90° C. to 190° C. or 100° C. to 180° C. If the drying temperature is below 80° C., the drying time may become excessively long, and if the drying temperature is excessively high, which is above 200° C., a super absorbent polymer having a moisture content lower than a desired moisture content may be obtained. Meanwhile, the drying temperature may mean the temperature of hot air which is used or the internal temperature of a device during the drying process.

According to an aspect of the present disclosure, Step 4 above may be performed by moving type drying.

The moving type drying refers to a method for drying a dried body by mechanically stirring the same during drying. At this time, the direction in which hot air passes through a material may be the same as or different from the circulation direction of the material. Alternatively, the material may be dried by circulating inside a dryer and passing through a heat medium fluid (heat oil) from a separate pipe outside the dryer.

As a device capable of performing drying by the above-described moving type drying, a horizontal-type mixer, a rotary kiln, a paddle dryer, a steam tube dryer, a moving type drier commonly used, or the like may be used.

In the case of the moving type drying step, the drying process may be performed at a temperature of about 100° C. to about 300° C., preferably 120° C. to 280° C. or 150° C.

to 250° C. If the drying temperature is excessively low, which is below 100° C., the drying time may become excessively long, and if the drying temperature is excessively high, which is above 300° C., super absorbent polymer chains may be damaged, which may degrade the overall physical properties, and also, a super absorbent polymer having a moisture content lower than a desired water content may be obtained.

Step 5: Pulverization Step

Next, a step of pulverizing the dried base polymer powder is performed.

Specifically, the pulverization step may be performed by pulverizing the dry base polymer powder to have a particle size of normal particle level, i.e., a particle diameter of 150 μm to 850 μm.

A pulverizer to be used for the above-described purpose may specifically be a vertical pulverizer, a turbo cutter, a turbo grinder, a rotary cutter mill, a cutter mill, a disc mill, a shred crusher, a crusher, a chopper, a disc cutter, or the like, but is not limited to the above-described examples.

Alternatively, as the pulverizer, a pin mill, a hammer mill, a screw mill, a roll mill, a disc mill, a jog mill, or the like may be used, but the pulverizer is not limited to the above-described examples.

In the preparation method of the present disclosure, super absorbent polymer particles having a small particle size distribution may be implemented in the micronization step compared to a typical chopping step, and since the moisture content is maintained relatively high after drying, even if pulverization is performed under mild conditions with relatively low pulverization power, a super absorbent polymer having a very high content of particles with a normal particle size of 50 μm to 850 μm may be obtained, and the fine powder generation rate may be greatly reduced.

The super absorbent polymer particles prepared as described above may include super absorbent polymer particles having a particle size of 150 μm to 850 μm, i.e., normal particles, in an amount of 80 wt % or greater, 85 wt % or greater, 89 wt % or greater, 90 wt % or greater, 92 wt % or greater, 93 wt % or greater, 94 wt % or greater, or 95 wt % or greater based on the total weight. The particle size of the above-described polymer particles may be measured according to the method of EDANA WSP 220.3 of the European Disposables and Nonwovens Association (EDANA) standards.

In addition, the super absorbent polymer particles may contain fine powder having a particle diameter of less than 150 μm in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less based on the total weight. This is in contrast to having fine powder in an amount of greater than about 20 wt % to about 30 wt % when a super absorbent polymer is prepared according to a typical preparation method.

Additive Introduction Step

According to an aspect of the disclosure, prior to the drying step (Step 4), a step of introducing an additive to the micronized and neutralized polymer may be further included.

The process of introducing an additive is a process for improving physical properties by using an additional additive within a range in which a desired effect is not inhibited, and the type of the additive is not particularly limited, wherein, for example, a polymerization initiator for removing residual monomers, a permeability enhancer for improving absorption properties, a fine powder anti-caking agent for recirculating generated fine powder, a fluidity enhancer, an antioxidant, a neutralizing agent, a surfactant, and the like may be used, but the additive is not limited thereto.

The additive introduction step may be performed simultaneously with Step 2, simultaneously with Step 3, after Step 2 and Step 3, or in at least one of the above-described steps. The additive introduction step may be performed a plurality of times if necessary, and may also be performed one or more times in each step.

If the additive introduction step is separately performed independently from Step 2 and Step 3, that is, if performed after Step 2 and Step 3 and before Step 4, the additive introduction step may be performed in a manner in which an additive is introduced while the polymer is being pulverized.

The pulverization of Step 5 described above may be equally applied to the pulverization above, and in the pulverization step, an additive may be introduced once or a plurality of times and mixed with the polymer.

Classification Step

Next, after the step of pulverizing the base polymer powder (Step 5), a step of classifying the pulverized super absorbent polymer particles according to the particle size may be further included.

Surface Cross-Linking Step

In addition, a step of forming a surface cross-linked layer on at least a portion of the surface of the base polymer particle in the presence of a surface cross-linking agent after pulverizing (Step 5) and/or classifying the base polymer powder may be further included. By the above-described step, a cross-linked polymer included in the base polymer powder may be further cross-linked by means of the surface cross-linking agent, so that the surface cross-linked layer may be formed on at least a portion of the surface of the base polymer powder.

The same contents described above with reference to a surface cross-linking agent may be equally applied to the surface cross-linking agent.

In addition, there is no limitation on a method for mixing the surface cross-linking agent with the base polymer powder. For example, a method in which a composition including a surface cross-linking agent and base polymer powder is introduced into a reaction tank and mixed, a method in a surface cross-linking agent is sprayed on the composition, a method in which a polymer composition and a surface cross-linking agent are continuously supplied to a continuously operating mixer, and the like may be used.

When the surface cross-linking agent and the base polymer powder are mixed, water and methanol may be mixed together and additionally added thereto. If water and methanol are added, there is an advantage in that the surface cross-linking agent may be evenly dispersed in the polymer composition. At this time, the content of water and methanol added may be appropriately adjusted to induce even dispersion of the surface cross-linking agent, to prevent aggregation of the polymer composition, and to optimize the surface penetration depth of the cross-linking agent.

The surface cross-linking process may be performed at a temperature of about 80° C. to about 250° C. More specifically, the surface cross-linking process may be performed at a temperature of about 100° C. to about 220° C., or about 120° C. to about 200° C. for about 20 minutes to about 2 hours, or about 40 minutes to about 80 minutes. When the above-described surface cross-linking process conditions are satisfied, the surface of the super absorbent polymer particles are sufficiently cross-linked, so that the absorbency under pressure may increase.

The means for raising the temperature for the surface cross-linking reaction is not particularly limited.

A heat medium may be supplied, or a heat source may be directly supplied for heating. At this time, the types of the heat medium that can be used may include steam, hot air, and a heated fluid such as hot oil, but are not limited thereto, and the temperature of a supplied heat medium may be appropriately selected in consideration of the means of the heat medium, the temperature raising rate, and the temperature raising target temperature. Meanwhile, the heat source that can be directly supplied may include heating through electricity, or heating through gas, but is not limited to the above-described examples.

Post-Treatment Step

According to an aspect of the present disclosure, after the step of forming the surface cross-linked layer on at least a part of the surface of the base polymer powder, the method may be performed by further including any one or more steps among a cooling step of cooling the super absorbent polymer particles having the surface cross-linking layer formed thereon, an adding-water step of adding water to the super absorbent polymer particles having the surface cross-linked layer formed thereon, and a post-treatment step of introducing an additive to the super absorbent polymer particles having the surface cross-linked layer formed thereon. At this time, the cooling step, the adding-water step, and the post-treatment step may be performed sequentially or simultaneously.

In the adding-water step, water or salt water may be used, through which the amount of remnants generated may be controlled. The amount of water to be used may be appropriately adjusted in consideration of a desired moisture content of a final product, and preferably, the water may be used in an amount of 0.1 wt % to 10 wt %, 0.5 wt % to 8 wt %, or 1 wt % to 5 wt % based on the absorbent polymer, but is not limited thereto.

In addition, after the adding-water step, an aging step may be further performed.

If salt water is used in the adding-water step, due to the conductivity of the salt water, the solution absorption rate relatively decreases, which allows the salt water to evenly spread during the aging step, thereby making it possible to achieve even absorption with respect to the absorbent polymer. In the aging step, a commonly used method may be applied without particular limitation, and for example, the aging step may be performed at 100° C. or lower, 80° C. or lower, preferably at 50° C. or lower for 10 minutes to 1 hour using a rotary stirring facility.

The additive introduced in the post-treatment step may be a surfactant, an inorganic salt, a permeability enhancer, an anti-caking agent, a fluidity enhancer, an antioxidant, and the like, but the present disclosure is not limited thereto.

By selectively performing the cooling step, the adding-water step, and the post-treatment step, the moisture content of a final super absorbent polymer may be increased by controlling the generation of remnants, and a high-quality super absorbent polymer product may be prepared.

The description of the method for preparing a super absorbent polymer according to the present disclosure may be applied to the above-described super absorbent polymer of the present disclosure.

Hereinafter, through specific aspects of the present disclosure, actions and effects of the present disclosure will be described in more detail. However, these aspects are only presented as examples of the present disclosure, and the scope of the present disclosure is not limited thereby.

EXAMPLES

Example 1

(Step 1: Polymer Preparation Step)

In a 5 L glass container equipped with a stirrer and a thermometer, 1500 g of acrylic acid, and as an internal cross-linking agent, 4.5 g of pentaerythritol triallyl ether (PETTAE), and 3402 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,800 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.15 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Example 2

(Step 1: Polymer Preparation Step)

In a 5 L glass container equipped with a stirrer and a thermometer, 1500 g of acrylic acid, and as an internal cross-linking agent, 5.25 g of pentaerythritol triallyl ether (PETTAE), and 3404 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,300 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.15 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Example 3

(Step 1: Polymer Preparation Step)

In a 5 L glass container equipped with a stirrer and a thermometer, 1500 g of acrylic acid, and as an internal cross-linking agent, 3.75 g of pentaerythritol triallyl ether (PETTAE), and 3400 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

150 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,600 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 3.5 g of water, 6 g of methanol, 0.07 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 1

(Step 1: Polymer Preparation Step)

A polymer was obtained in the same manner as in Example 1.

(Steps 2 to 3: Micronization and Neutralization Steps)

597 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,800 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5.5 g of water, 6 g of methanol, 0.15 g of ethylene glycol diglycidyl ether (EJ-1030S), and 0.3 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 2

(Step 1: Polymer Preparation Step)

A polymer was obtained in the same manner as in Example 1.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,200 rpm. Thereafter, the mixture was further pushed into a perforated plate with a plurality of 10 mm holes at a rotational speed of 1,100 rpm to obtain a hydrogel polymer in the form of pulverized gel.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5.5 g of water, 5 g of methanol, and 0.07 g of ethylene glycol diglycidyl ether (EJ-1030S) was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 3

(Step 1: Polymer Preparation Step)

A polymer was obtained in the same manner as in Example 2.

(Steps 2 to 3: Micronization and Neutralization Steps)

150 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,700 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5 g of water, 6 g of methanol, 0.15 g of ethylene carbonate, and 0.38 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 185° C. for 50 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 4

(Step 1: Polymer Preparation Step)

A polymer was obtained in the same manner as in Example 3.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 1,100 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

The hydrous super absorbent polymer particles were uniformly dried in the same manner as in Example 1 to obtain a dried body.

(Step 5: Pulverization and classification step)

The polymer dried in Step 4 above was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.15 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

<Experimental Example 1>—Derivation of Swelling Factor (SF)

The absorbency of the super absorbent polymer of Example 1 was measured according to the following steps, and then a swelling factor (SF) value was calculated and derived.

Step 1) Preparation of Super Absorbent Polymer Sample 10 mg of a super absorbent polymer sample was placed in a 40 mL conical tube, and added with 30 mL of distilled water, and then the mixture was left to stand at room temperature for 30 minutes.

Thereafter, 1 mL of a 5 mg/mL aqueous solution of Blue dextran (10 kDa) was added to the above-described sample, and the mixture was centrifuged for 20 minutes by setting the rotation speed of a centrifugal separator at 241 G.

Step 2) Measurement of Absorbance and Calculation of Swelling Factor (SF)

Thereafter, a supernatant was filtered, and then an absorbance ($A_S$) of the corresponding sample was measured at a wavelength of 620 nm by using a UV-Vis spectrophotometer (Cary 8454 Spectrophotometer, Agilent).

In addition, a sample was prepared as a reference sample in the same manner as the above-described method except that the super absorbent polymer sample was not added, and an absorbance ($A_R$) in a 620 nm region was measured by the above method.

The absorbance of each of Examples and Comparative Examples was measured by the above-described method, and swelling factors were calculated according to Equation 1 below.

$$SF = 1 + \left[(7{,}700/w) \times (A_S - A_R)/A_S\right] \quad \text{[Equation 1]}$$

In [Equation 1] above, w is a weight (mg) of the super absorbent polymer, $A_S$ is an absorbance at 620 nm of a solution obtained by centrifuging an aqueous solution including the super absorbent polymer and Blue dextran under the condition of 241 G, and $A_R$ is an absorbance at 620 nm of an aqueous solution including Blue dextran, which is a reference sample.

TABLE 1

| | Absorbance ($A_S$, 620 nm) | Swelling factor |
|---|---|---|
| Example 1 | 0.19158 | 101 |
| Example 2 | 0.18951 | 94 |
| Example 3 | 0.18901 | 92 |
| Comparative Example 1 | 0.18556 | 79 |
| Comparative Example 2 | 0.18980 | 84 |
| Comparative Example 3 | 0.19478 | 112 |
| Comparative Example 4 | 0.19817 | 123 |

Absorbance of reference sample ($A_R$): 0.16665

<Experimental Example 2>—Measurement of Surface Area with Respect to Real Volume of Super Absorbent Polymer The surface area with respect to real volume of the super absorbent polymer of each of Examples and Comparative Examples was obtained according to Step 1 to Step 3 below.

Step 1) Drying and Sampling of Super Absorbent Polymer

The super absorbent polymer of Example 1 was dried at about 100° C. for about 12 hours, and the dried super absorbent polymer was sampled in a size of 1.5 cm×1.5 cm×1.5 cm (width×length×height).

Step 2) Derivation of Image

The sampled super absorbent polymer of Example 1 was analyzed using XRM (ZEISS Co., Ltd, Xradia 620 Versa) under the following conditions to derive a 3D image of the super absorbent polymer.

<Conditions>

X-Ray Energy: 70 kV
detector: Flat Pane
Voxel Size: 5 μm
Measurement time: 0.05 s/frame
total images: 4501 images Step 3) Derivation of Surface Area with Respect to Real Volume ($S_{SAP}/V_C$)

(1) A region of interest (measurement region) was set and truncated from the XRM 2D cross-sectional image of the super absorbent polymer of Example 1 subjected to the 3D reconstruction.

(2) Gaussian blur was applied to the truncated 2D cross-sectional image to remove noise. Subsequently, the 2D cross-sectional image was converted into a binarization image by using the Otsu's thresholding method to distinguish between a background image and a super absorbent polymer particle image. The above process was applied to all measurement target 2D cross-sectional images to obtain 2D cross-sectional images showing separated super absorbent polymer particles.

(3) The plurality of 2D cross-sectional images were stacked, and 3D rendering was performed thereon.

(4) From the 3D rendered volume data, a volume ($V_C$) of the total particles of the super absorbent polymer of Example 1 was measured. In addition, in consideration of connectivity of the 3D rendered images, a surface area ($S_{SAP}$) of the total particles of the super absorbent polymer of Example 1 excluding the surface area of regions of closed pores was measured. The surface area ($S_{SAP}$) of the super absorbent polymer particles of Example 1 was divided by the volume ($V_C$) of the total particles of the super absorbent polymer of Example 1 to derive a surface area with respect to real volume of the super absorbent polymer of Example 1.

The surface area with respect to real volume of the super absorbent polymer of each of the rest of Examples and Comparative Examples was obtained by the same method.

TABLE 2

| | Surface area with respect to real volume ($mm^{-1}$) |
|---|---|
| Example 1 | 47.6 |
| Example 2 | 54.2 |
| Example 3 | 55.3 |
| Comparative Example 1 | 39.6 |
| Comparative Example 2 | 42.6 |
| Comparative Example 3 | 35.0 |
| Comparative Example 4 | 34.2 |

<Experimental Example 3>—Measurement of Convexity and CE Diameter

Additionally, the super absorbent polymers prepared in Examples and Comparative Examples were evaluated for the convexity and CE diameter of the super absorbent resin particles by the following methods and the results are shown in Table 3 below.

Unless otherwise stated, the following evaluation of physical properties was all conducted at constant temperature/humidity (23±1° C., relative humidity 50±10%), and physiological saline or brine refers to 0.9 wt % sodium chloride (NaCl) aqueous solution.

A sample to be measured was left to stand under constant temperature/humidity conditions for 24 hours, and was evaluated for each physical property.

The super absorbent polymers of Examples and Comparative Examples were evaluated for the convexity and CE diameter by the following methods using morphologi 4 of Malvern Panalytical Co., Ltd.

1) Preparation of sample: 1 g of a particle sample of a super absorbent polymer to be measured was prepared. At this time, the super absorbent polymer was classified at 1.0 amplitude for 10 min by using a classifier of Retsch Company and separated into individual particles with a particle diameter of 300 μm to 600 μm without damage to the particles to prepare 1 g of the sample. At this time, setting values of a Sample Suspension Dispersion Unit are as shown in FIG. 1.

Figure 2:
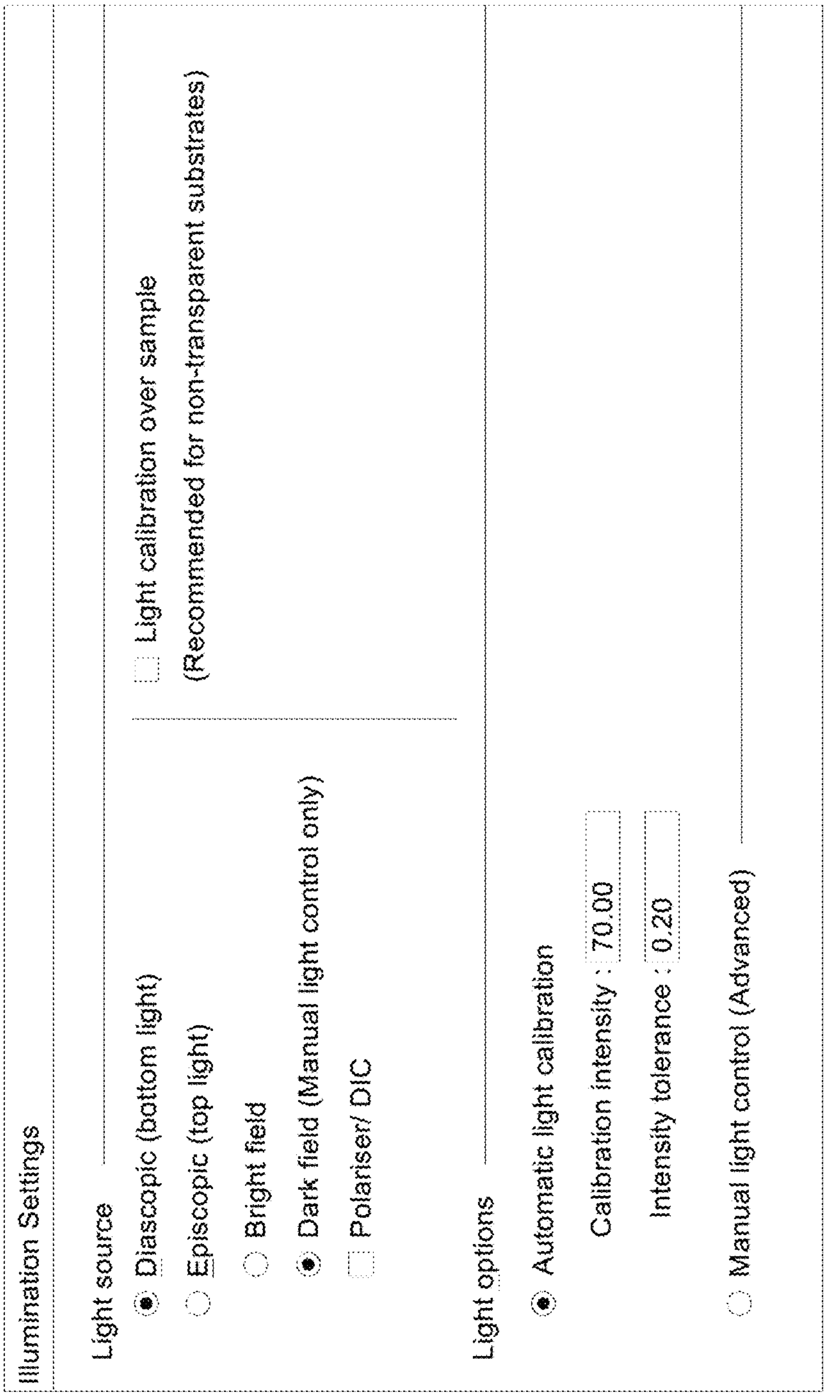
FIG. 2 shows illumination setting values in morphologi 4 of Malvern Panalytical Co., Ltd.
Figure 3:
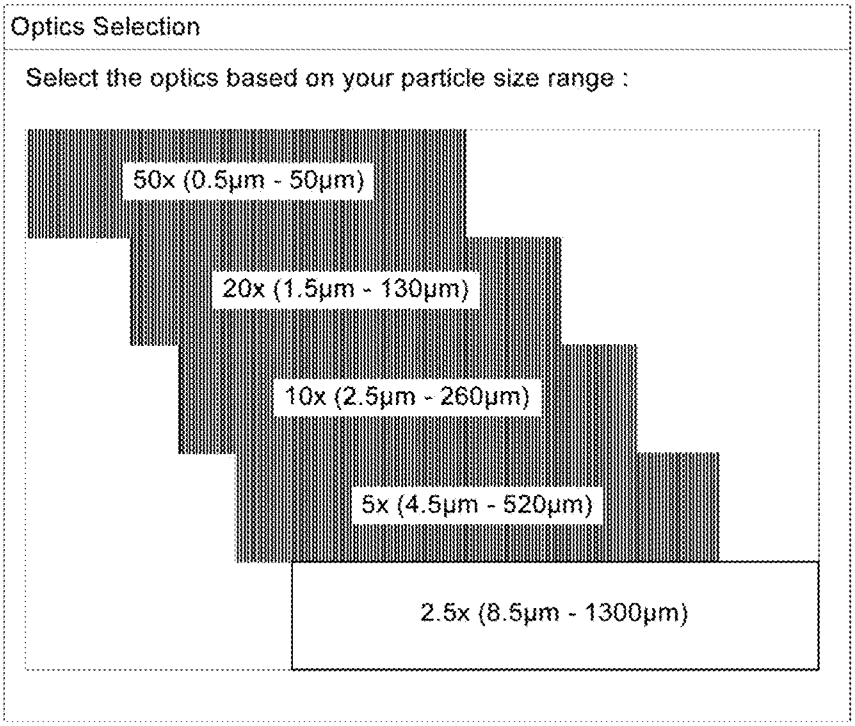
FIG. 3 shows Optics Selection setting values in morphologi 4 of Malvern Panalytical Co., Ltd.

2) Image acquisition: The prepared sample was set on a stage in an instrument, and then scanned at a magnification of 2.5 to obtain images of individual particles. At this time, illumination setting values and optics selection setting values are as shown in FIG. 2 and FIG. 3, respectively.

Figure 4:
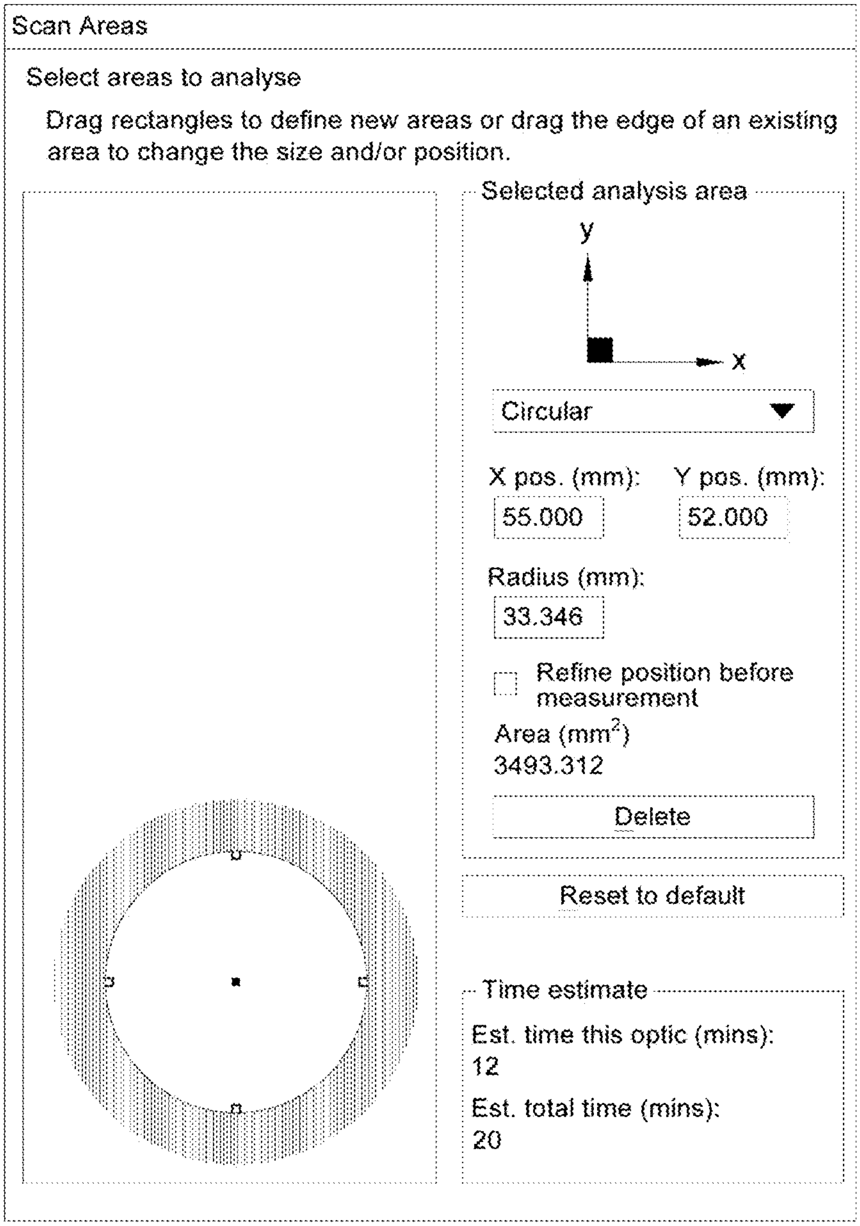
FIG. 4 shows Scan Area setting values in morphologi 4 of Malvern Panalytical Co., Ltd.

3) Image processing: For the acquired images, parameter values for each particle, such as an image obtained by capturing a 3D image of a 3-dimensional particle as a 2D image, a circle equivalent (CE) diameter, the shortest diameter, the longest diameter, and the circumference and convex hull perimeter of an actual particle, were measured. At this time, scan area setting values are as shown in FIG. 4, and the measurements were performed without setting filtering values for the particles.

4) Based on the data analyzed for each particle, the convexity and CE diameter values of the entire particles included in the sample were obtained.

Among the above, average values of the convexity and the circle equivalent (CE) diameters calculated by Equation 1 below are shown in Table 3 below.

$$M_c = L_s/L \qquad \text{[Equation 2]}$$

In Formula 1 above, Me is convexity, $L_s$ refers to a length of an elastic band when it is assumed that an image obtained by capturing a 3D image of a 3-dimensional particle to be measured as a 2D image is surrounded by an imaginary elastic band which stretches around the outline of the image, and L refers to an actual circumference length of the image obtained by capturing a 3D image of a 3-dimensional particle to be measured as a 2D image.

TABLE 3

| | Convexity average | CE diameter average (μm) |
|---|---|---|
| Example 1 | 0.85 | 321 |
| Example 2 | 0.89 | 359 |
| Example 3 | 0.88 | 398 |
| Comparative Example 1 | 0.93 | 303 |
| Comparative Example 2 | 0.91 | 275 |
| Comparative Example 3 | 0.88 | 333 |
| Comparative Example 4 | 0.92 | 318 |

<Experimental Example 4>—Evaluation of Physical Properties

The super absorbent polymers prepared in Examples and Comparative Examples were evaluated for physical properties by the following methods and the results are shown in Table 4 and Table 5 below.

Unless otherwise stated, the following evaluation of physical properties was all conducted at constant temperature/humidity (23±1° C., relative humidity 50±10%), and physiological saline or brine refers to 0.9 wt % sodium chloride (NaCl) aqueous solution.

A sample to be measured was left to stand under constant temperature/humidity conditions for 24 hours, and was evaluated for each physical property.

(1) Measurement of Gel Strength

The super absorbent polymers prepared in Examples and Comparative Examples were evaluated for gel strength by the following method.

Brine and ascorbic acid (ACS) were used to prepare brine having 0.005% ASC. Subsequently, the brine having 0.005% ASC and approximately 2.5 g (±0.01 g) of the super absorbent polymer were introduced into a 100 ml beaker and mixed, and the beaker was sealed with clear wrap, and then placed in an oven to be allowed to swell for 24 hours at a temperature of 40° C. Thereafter, the clear wrap was removed from the beaker taken out of the oven, and the beaker was left to stand at room temperature for 30 minutes, and then gel strength of the super absorbent polymer was measured using a tensile compression tester (manufacturer: Nidec-Shimpo).

(2) Centrifuge Retention Capacity (CRC, g/g)

The centrifuge retention capacity of the super absorbent polymer of each of Examples and Comparative Examples by absorption magnification under no load was measured in accordance with the European Disposables and Nonwovens Association (EDANA) standard EDANA WSP 241.3.

As described in the EDANA WSP 241.0, the measurement was performed at a temperature of 23±2° C. and a relative humidity of 45±15%.

Specifically, a super absorbent polymer $W_0$(g) (about 0.2 g) obtained through each of Examples and Comparative Examples was uniformly placed in a nonwoven fabric bag and sealed, and then immersed in physiological saline (0.9 wt %) at room temperature. After 30 minutes, the bag was drained for 3 minutes under the condition of 250 G using a centrifugal separator, and a weight $W_2$(g) of the bag was measured. In addition, the same operation was performed without using a polymer, and then a weight $W_1$(g) at that time was measured.

CRC (g/g) was calculated according to Equation 3 below using each obtained weight.

$$CRC(\text{g/g}) = \{[W_2(\text{g}) - W_1(\text{g})]/W_0(\text{g})\} - 1 \quad \text{[Equation 3]}$$

The above-described measurement was repeated 5 times, and an average value and a standard deviation were obtained.

(3) Absorbency Under Pressure (AUP, g/g)

The absorbency under pressure of 2.07 kPa (0.3 psi) of the super absorbent polymer of each of Examples and Comparative Examples was measured according to the method of EDANA WSP 242.3.

As described in the EDANA WSP 242.0, the measurement was performed at a temperature of 23±2° C. and a relative humidity of 45±15%.

Specifically, a 400-mesh wire made of stainless steel was mounted on the bottom of a plastic cylinder having an inner diameter of 25 mm. Under the conditions of room temperature and a humidity of 50%, a super absorbent polymer $W_3$(g) (0.9 g) was evenly sprayed on the wire mesh, and a piston capable of further applying a load of 2.07 kPa (0.3 psi) evenly thereon was installed to be slightly smaller than an outer diameter of 25 mm, to have no gap with an inner wall of the cylinder, and to have no disturbance of an upward and downward movement. At this time, a weight $W_4$(g) of the above-described device was measured.

A glass filter having a diameter of 90 mm and a thickness of 5 mm was placed on the inside of a petri dish having a diameter of 150 mm, and physiological saline composed of 0.9 wt % sodium chloride was set to the same level as the upper surface of the glass filter. One sheet of filter paper having a diameter of 90 mm was placed thereon. The measurement device was placed on the filter paper, and a liquid was absorbed under a load for 1 hour. After 1 hour, the measurement device was lifted, and a weight $W_5$ (g) thereof was measured.

Absorbency under pressure (g/g) was calculated according to Equation 4 below using each obtained weight.

$$AUP(\text{g/g}) = [W_5(\text{g}) - W_4(\text{g})]/W_3(\text{g}) \quad \text{[Equation 4]}$$

The above-described measurement was repeated 5 times, and an average value and a standard deviation were obtained.

(4) Vortex Time

The vortex time of the reference super absorbent polymer of each of Examples and Comparative Examples was measured by the following method.

(i) First, 50 mL of 0.9% salt water was added to a 100 mL beaker having a flat bottom using a 100 mL mass cylinder.

(ii) Next, the beaker was placed in the center of a magnetic stirrer, and a circular magnetic bar (diameter 30 mm) was placed inside the beaker.

(iii) Thereafter, the stirrer was operated such that the magnetic bar was stirred at 600 rpm, and the lowest portion of a vortex generated by the stirring was brought into contact with the top of the magnetic bar.

(iv) After confirming that the temperature of the salt water in the beaker reached 24.0° C., 2±0.01 g of a super absorbent polymer sample was introduced thereinto and simultaneously, a stop watch was operated, and the time until the vortex disappeared and the surface of the liquid became completely horizontal was measured in seconds, which was set to vortex time.

(5) Free swelling capacity ($FSC_{110}$) and 1-minute absorbency ($WFA_{110}$) in water having electrical conductivity value of 110 μS/cm For the super absorbent polymer of Example 1, a free swelling capacity ($FSC_{110}$) and a 1-minute water absorbency ($WFA_{110}$) in water having an electrical conductivity value of 110 μS/cm at 24° C. were measured by the following methods. Detailed measurement processes were as follows.

(i) Tea bags for broth in a size of 18 cm×28 cm were respectively placed in a total of eight 2 L beakers.

(ii) 1 L of water having an electrical conductivity of 110 μS/cm at 24° C. was introduced into each of the beakers, the tea bag was left to stand in a submerged state in each of the beakers for (60 seconds/600 seconds/1800 seconds).

(iii) The tea bag for broth was taken out of each beaker after (60 seconds/600 seconds/1800 seconds), a weight (Wa) of the tea bag for broth was recorded when water stopped dripping from the tea bag for broth. Among the above, a weight of the tea bag for broth taken out after 60 seconds (1 minute), the weight measured when water stopped from dripping from the tea bag, was defined as $W_6$, (a blank value).

(iv) Tea bags for broth in a size of 18 cm×28 cm were respectively placed in another total of eight 2 L beakers.

(v) 1 g of the super absorbent polymer (SAP) of Example 1 was accurately weighed and evenly sprinkled at a lower end of each of the tea bags for broth.

(vi) 1 L of water having an electrical conductivity of 110 μS/cm at 24° C. was introduced into each of the beakers, and the tea bag was respectively left to stand in a submerged state in each of the beakers for (60 seconds/600 seconds/1800 seconds).

(vii) The tea bag for broth sprinkled with the super absorbent polymer was taken out of each beaker after (60 seconds/600 seconds/1800 seconds), a weight ($W_s$) of the tea bag for broth sprinkled with the super absorbent polymer was recorded when water having an electrical conductivity value of μS/cm stopped dripping from the tea bag for broth. Among the above, a weight of the tea bag for broth sprinkled with the super absorbent polymer and taken out after 60 seconds (1 minute), the weight measured when water stopped from dripping from the tea bag, was defined as $W_7$.

(viii) The weight of the tea bag for broth measured in each beaker was applied to Equation 5 below to calculate a free swelling capacity ($FSC_{110}$) in water having an electrical conductivity value of 110 μS/cm at 24° C.

$$FSC_{110}(\text{g/g}) = W_a - W_s \quad \text{[Equation 5]}$$

(ix) A 1-minute absorbency ($WFA_{110}$) in water having an electrical conductivity of 110 μS/cm was calculated by using Equation 6 below. That is, the 1-minute absorbency ($WFA_{110}$) in water having an electrical conductivity of 110 μS/cm refers to the free swelling capacity ($FSC_{110}$) in water having an electrical conductivity of 110 μS/cm at 24° C. calculated using the tea bag for broth introduced into the beaker for 1 minute.

$$WFA_{110}(g/g) = W_7 - W_6 \quad \text{[Equation 6]}$$

(6) Content of Extractable Contents in Water Having Electrical Conductivity of 110 μS/cm The content of extractable contents was measured for the super absorbent polymer of each of Examples and Comparative Examples. The extractable contents were measured employing the method of EDANA WSP 270.2.

Specifically, among the super absorbent polymers prepared by the method according to each of Examples and Comparative Examples, 1.0 g of a sample having a particle diameter of 150 μm to 850 μm was placed in a 250 mL Erlenmeyer flask, and then placed in 200 mL of water having an electrical conductivity of 110 μS/cm and stirred at 250 rpm to be subjected to free swelling for (1 hour/16 hours), and then an aqueous solution was filtered through filter paper.

The filtered solution was primarily titrated to pH 10 with a 0.1 N caustic soda solution, and then back-titrated to pH 2.7 with a 0.1 N hydrogen chloride solution to calculate an uncross-linked polymer material from the amount required for neutralization as extractable contents (weight %).

A super absorbent polymer of the present disclosure has an effect of having excellent absorption physical properties as well as a suitable gel strength by adjusting a numerical value of a swelling factor to a predetermined level, the value derived by using the absorbance of a solution obtained by centrifuging an aqueous solution including a super absorbent polymer (SAP) and Blue dextran.

Although the super absorbent polymer has been described with reference to the specific aspects, it is not limited thereto. Therefore, it will be readily understood by those skilled in the art that various modifications and changes can be made thereto without departing from the spirit and scope of the present disclosure defined by the appended claims.

The invention claimed is:

1. A polyacrylic acid (salt)-based super absorbent polymer having a swelling factor (SF) value of 90 to 110 derived by Equation 1 below:

$$SF = 1 + \left[(7{,}700/w) \times (A_S - A_R)/A_S\right] \quad \text{[Equation 1]}$$

wherein in [Equation 1] above, w is a weight (mg) of the super absorbent polymer, $A_S$ is an absorbance at 620 nm of a solution obtained by centrifuging an aqueous solution including the polyacrylic acid (salt)-based super absorbent polymer and Blue dextran under a condition of 200 G to 280 G, and $A_R$ is an absorbance at 620 nm of an aqueous solution including the Blue dextran, which is a reference sample; and wherein when the polyacrylic acid (salt)-based super absorbent polymer is swollen for 1 minute with water

TABLE 4

| | Gel strength (N) | CRC (g/g) | 0.3AUP (g/g) | Vortex time (sec) | 600 s $FSC_{110}$ (g/g) | 1800 s $FSC_{110}$ (g/g) | $WFA_{110}$ (g/g) |
|---|---|---|---|---|---|---|---|
| Example 1 | 0.98 | 37.1 | 32.0 | 24 | 341 | 388 | 191 |
| Example 2 | 0.95 | 36.2 | 31.5 | 28 | 339 | 376 | 199 |
| Example 3 | 0.96 | 36.8 | 32.8 | 26 | 327 | 359 | 208 |
| Comparative Example 1 | 0.88 | 32.1 | 26.4 | 40 | 307 | 324 | 142 |
| Comparative Example 2 | 0.91 | 30.9 | 27.1 | 38 | 286 | 316 | 98 |
| Comparative Example 3 | 0.93 | 29.4 | 25.9 | 39 | 294 | 328 | 138 |
| Comparative Example 4 | 0.89 | 31.3 | 28.2 | 41 | 309 | 332 | 117 |

TABLE 5

| | Content (%) of extractable contents in water having electrical conductivity of 110 μS/cm at 24° C. | |
|---|---|---|
| | Swelling time 1 hr | Swelling time 16 hrs |
| Example 1 | 8.5 | 13.5 |
| Example 2 | 9.6 | 16.8 |
| Example 3 | 10.7 | 17.7 |
| Comparative Example 1 | 15.6 | 25.5 |
| Comparative Example 2 | 17.5 | 24.9 |
| Comparative Example 3 | 16.9 | 27.1 |
| Comparative Example 4 | 18.1 | 26.6 |

As can be confirmed in Table 1 to Table 5 above, it has been confirmed that if a super absorbent polymer satisfies the swelling factor value according to the present disclosure, the super absorbent polymer may exhibit an excellent physical property balance by simultaneously improving absorption performance such as centrifuge retention capacity, absorbency under pressure, and absorption rate while having a suitable gel strength.

having an electrical conductivity value of 100 μS/cm to 130 μS/cm, a free swell capacity of the water absorbed by the polyacrylic acid (salt)-based super absorbent polymer is 175 g or more.

2. The polyacrylic acid (salt)-based super absorbent polymer of claim 1, wherein the polyacrylic acid (salt)-based super absorbent polymer has a swelling factor (SF) value of 90 to 105.

3. The polyacrylic acid (salt)-based super absorbent polymer of claim 1, wherein the absorbance ($A_S$) at 620 nm of the solution obtained by centrifuging the aqueous solution including the polyacrylic acid (salt)-based super absorbent polymer and the Blue dextran under the condition of 200 G to 280 G is 0.18 or greater.

4. The polyacrylic acid (salt)-based super absorbent polymer of claim 1, wherein the absorbance ($A_S$) at 620 nm of the solution obtained by centrifuging the aqueous solution including the polyacrylic acid (salt)-based super absorbent polymer and Blue dextran under the condition of 200 G to 280 G is 0.20 or less.

5. The polyacrylic acid (salt)-based super absorbent polymer of claim 1, wherein the polyacrylic acid (salt)-based super absorbent polymer has a surface area with respect to real volume of 43 $mm^{-1}$ or greater.

6. The polyacrylic acid (salt)-based super absorbent polymer of claim 1, wherein the polyacrylic acid (salt)-based super absorbent polymer has an average value of convexity of 0.94 or less as calculated by Equation 2 below for entire particles:

$$M_c = L_s/L \quad \text{[Equation 2]}$$

wherein in Formula 1 above, $M_c$ is convexity, $L_s$ refers to a length of an elastic band when it is assumed that an image obtained by capturing a 3D image of a 3-dimensional particle to be measured as a 2D image is surrounded by an imaginary elastic band which stretches around the outline of the image, and L refers to an actual circumference length of the image obtained by capturing a 3D image of a 3-dimensional particle to be measured as a 2D image.

7. The polyacrylic acid (salt)-based super absorbent polymer of claim 1, wherein the polyacrylic acid (salt)-based super absorbent polymer has an average value of circle equivalent diameters (CE) of 220 μm to 400 μm.

8. The polyacrylic acid (salt)-based super absorbent polymer of claim 1, wherein the polyacrylic acid (salt)-based super absorbent polymer has an extractable content of 15 wt % or less based on a total weight of the polyacrylic acid (salt)-based super absorbent polymer, said extractable content measured after performing free swelling for 1 hour with water having an electrical conductivity of 100 μS/cm to 130 μS/cm.

9. The polyacrylic acid (salt)-based super absorbent polymer of claim 1, wherein the polyacrylic acid (salt)-based super absorbent polymer has an extractable content of 25 wt % or less based on a total weight of the polyacrylic acid (salt)-based super absorbent polymer, said extractable content measured after performing free swelling for 16 hour with water having an electrical conductivity of 100 μS/cm to 130 μS/cm.

10. The polyacrylic acid (salt)-based super absorbent polymer of claim 1, wherein the polyacrylic acid (salt)-based super absorbent polymer has a centrifuge retention capacity (CRC) of 33 g/g or greater as measured according to a method of EDANA WSP 241.3.

11. The polyacrylic acid (salt)-based super absorbent polymer of claim 1, wherein the polyacrylic acid (salt)-based super absorbent polymer has an absorbency under pressure (AUP) of 25 g/g or greater as measured under 2.07 kPa (0.3 psi) according to a method of EDANA WSP 242.3.

12. The polyacrylic acid (salt)-based super absorbent polymer of claim 1, wherein when the polyacrylic acid (salt)-based super absorbent polymer is swollen for 1 minute with water having an electrical conductivity value of 100 μS/cm to 130 μS/cm, a free swell capacity of the water absorbed by the polyacrylic acid (salt)-based super absorbent polymer is 185 g or more.

13. The polyacrylic acid (salt)-based super absorbent polymer of claim 1, wherein the polyacrylic acid (salt)-based super absorbent polymer has a gel strength of 0.7 N or greater.

* * * * *